United States Patent
Ogihara et al.

(10) Patent No.: US 7,483,318 B2
(45) Date of Patent: Jan. 27, 2009

(54) STORAGE MANAGEMENT PROCESS, STORAGE MANAGEMENT APPARATUS, AND COMPUTER-READABLE MEDIUM STORING STORAGE MANAGEMENT PROGRAM

(75) Inventors: Kazutaka Ogihara, Kawasaki (JP); Masahisa Tamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 11/790,671

(22) Filed: Apr. 26, 2007

(65) Prior Publication Data
US 2008/0068899 A1 Mar. 20, 2008

(30) Foreign Application Priority Data
Sep. 15, 2006 (JP) .............................. 2006-250177

(51) Int. Cl.
*G11C 7/00* (2006.01)
(52) U.S. Cl. .................. 365/200; 365/201; 365/189.04; 365/185.09; 711/114; 711/111; 711/100
(58) Field of Classification Search .................. 365/200, 365/201, 185.09, 189.04; 711/114, 111, 711/100
See application file for complete search history.

(56) References Cited

U.S. PATENT DOCUMENTS

| | | | | |
|---|---|---|---|---|
| 5,640,506 A | * | 6/1997 | Duffy | 714/6 |
| 6,078,990 A | * | 6/2000 | Frazier | 711/114 |
| 6,088,330 A | * | 7/2000 | Bruck et al. | 370/228 |
| 7,017,107 B2 | * | 3/2006 | Talagala et al. | 714/819 |
| 2005/0216813 A1 | * | 9/2005 | Cutts et al. | 714/752 |

OTHER PUBLICATIONS

Patent Abstracts of Japan, Publication No. 2000-076207, Published Mar. 14, 2000.
"Patrol Function Enhancing Date Reliability" published in Japanese on the Internet by Fujitsu Limited at the URL http://storage-system.fujitsu.com/jp/products/iadiskarray/feature/a01/.

* cited by examiner

*Primary Examiner*—Richard Elms
*Assistant Examiner*—Eric Wendler
(74) *Attorney, Agent, or Firm*—Staas & Halsey LLP

(57) ABSTRACT

A storage management process and a storage management apparatus for managing first data stored in a storage area in a storage device in a first one of storage nodes constituting a distributed storage system. The first data is read out from the storage device and checked for normality in response to a request. When the first data is abnormal, a second one of the storage nodes paired with the first one is determined by reference to management information which is stored in advance, and second data which is identical to the first data and managed by the second one of the storage nodes is acquired. Then, the storage area is overwritten with the acquired second data when the first data is abnormal.

19 Claims, 16 Drawing Sheets

STORAGE MANAGEMENT PROCESS, STORAGE MANAGEMENT APPARATUS, AND COMPUTER-READABLE MEDIUM STORING STORAGE MANAGEMENT PROGRAM

CROSS-REFERENCE TO RELATED APPLICATIONS

This application is based upon and claims the benefits of priority from the prior Japanese Patent Application No. 2006-250177 filed on Sep. 15, 2006, the entire contents of which are incorporated herein by reference.

BACKGROUND OF THE INVENTION

1. Field of the Invention

The present invention relates to a storage management process, a storage management apparatus, and a computer-readable medium storing a storage management program for managing data in a plurality of storage nodes in a distributed manner.

2. Description of the Related Art

In the disk drives, failure can occur in a block or sector even during operation as well as during installation. When a block of a disk in which initially data are correctly written becomes defective, the data written in the bad block cannot be read out (i.e., the data loss occurs) in the worst case. (The data loss means that data stored in a storage system is lost. Therefore, for example, in the case where identical data is doubly stored in two different storage nodes, the data loss does not occur even when the data stored in one of the two storage nodes is lost as long as the data stored in the other of the two storage nodes remains.)

As mentioned above, the bad block is a serious risk factor in data preservation. In order to detect a bad block, it is necessary to actually access the bad block. In some types of RAID (Redundant Array of Independent Disks) systems, a RAID controller periodically checks mediums in disk drives. When the RAID controller detects a bad block, the RAID controller acquires the data stored in the bad block, on the basis of data stored in another disk drive, and writes the acquired data in the disk drive having the bad block. Thus, the data stored in the bad block is written in a region which is different from the bad block and called an alternative block. Thereafter, when a request for access to a region in the bad block occurs, the RAID controller accesses a block as an alternative to the bad block, so that it looks as if the RAID system has no bad block and the data are stored in the initial positions. The writing in the alternative block is disclosed in, for example, "Patrol Function Enhancing Data Reliability," published in Japanese on the Internet by Fujitsu Limited at the URL "http//:storage-system.fujitsu.com/jp/products/iadis-karray/feature/a01/" and searched for by the applicant on Aug. 31, 2006.

In addition, troubles in a disk device can cause unintentional writing of data in a position different from an original position in which the data is to be written. In this case, the data is also lost although data reading operations can be performed, as distinct from the case of the bad block.

In a system which has been proposed as a countermeasure against the above data loss, data are redundantly and distributedly stored over multiple computers (nodes). When a failure occurs in a node in the above system, it is possible to restore data stored in the failed node on the basis of data stored in another node, for example, as disclosed in Japanese Unexamined Patent Publication No. 2000-076207, paragraph No. 0046.

However, according to the technique disclosed in Japanese Unexamined Patent Publication No. 2000-076207, an operation for restoration of a node is performed after a failure occurs in the node. Therefore, the reliability of the system is lowered during the operation for restoration. That is, when a failure occurs in a node, data stored in another node is accessed during the operation for restoration. Therefore, it is unnecessary to stop the service. However, the data redundancy is not regained until the failed node is restored, so that the system reliability is lowered during the operation for restoration. In addition, since it takes a long time to restore the entire node, it is necessary to use the system with the lowered reliability for the long time.

In the above circumstances, it is desired to detect a sign of the data loss in a system in which data are redundantly and distributedly stored over multiple nodes, and remove the cause of a data loss before data is actually lost. Further, even when a data loss has already occurred, it is necessary to perform an operation for restoring the node on a per-data access basis.

SUMMARY OF THE INVENTION

The first object of the present invention is to provide a storage management process and a storage management apparatus which can suppress a factor which causes a data loss in a distributed storage system.

The second object of the present invention is to provide a computer-readable medium storing a storage management program which can suppress a factor which causes a data loss in a distributed storage system.

In order to accomplish the first object, according to the first aspect of the present invention, a storage management process is provided. The storage management process is provided for managing first data stored in a first storage area in a storage device which a first one of a plurality of storage nodes has, where the plurality of storage nodes are connected with each other, have storage devices for storing data, and constitute a distributed storage system managing the data stored in the storage devices in a distributed manner. The storage management process comprises the steps of: (a) reading out the first data from the storage device, and determining whether or not the first data is normal, when the first one of the plurality of storage nodes receives a request to check the first data; (b) determining a second one of the plurality of storage nodes to be paired with the first one of the plurality of storage nodes by reference to management information which is stored in advance and in which the second one of the plurality of storage nodes is registered, and acquiring second data which is identical to the first data and managed by the second one of the plurality of storage nodes, when an abnormality is detected in the first data; and (c) overwriting the first storage area with the second data when an abnormality is detected in the first data and the second data is acquired in step (b).

In addition, in order to accomplish the first object, according to the second aspect of the present invention, a storage management apparatus is also provided. The storage management apparatus manages first data stored in a first storage area in a storage device which a first one of a plurality of storage nodes has, where the plurality of storage nodes are connected with each other, have storage devices for storing data, and constitute a distributed storage system managing the data stored in the storage devices in a distributed manner. The storage management apparatus comprises: a management-information storing unit which stores management information in which a second one of the plurality of storage nodes is registered, where the second one of the plurality of storage nodes is paired with the first one of the plurality of storage nodes and manages second data identical to the first data; a data checking unit which reads out the first data from the storage device, and determines whether or not the first data is normal, when the first one of the plurality of storage nodes receives an instruction to check the first data; a data acquisition unit which recognizes the second one of the plurality of storage nodes paired with the first one of the plurality of storage nodes by reference to the management information, and acquires the second data, when the data checking unit detects an abnormality in the first data; and a data writing unit which overwrites the first storage area with the second data when the data checking unit detects an abnormality in the first data and the data acquisition unit acquires the second data.

Further, in order to accomplish the second object, a computer-readable medium storing a storage management program which makes a computer realize the above storage management apparatus according to the second aspect of the present invention is provided.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

A preferred embodiment of the present invention will be described below with reference to the accompanying drawings.

Outline of the Present Invention

Figure 1:
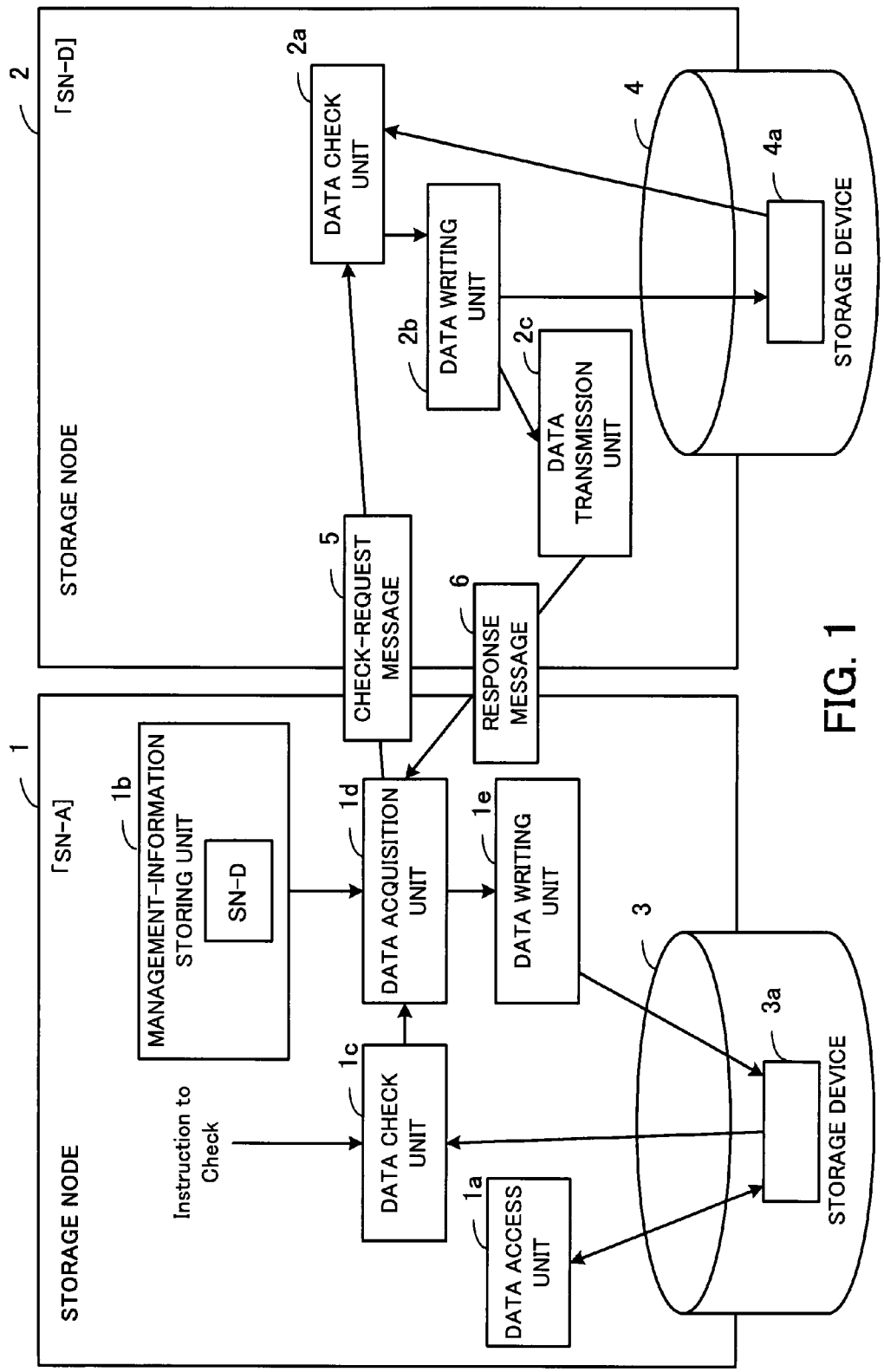
FIG. 1 is a conceptual diagram illustrating an outline of the present invention.

FIG. 1 is a conceptual diagram illustrating an outline of the present invention. FIG. 1 shows a distributed storage system having two storage nodes 1 and 2, which are connected through a network so that data are managed in a distributed manner. That is, common data items 3a and 4a are stored in each of the storage devices 3 and 4, which are respectively controlled by the storage nodes 1 and 2. Processing performed by the storage nodes 1 and 2 in liaison with each other maintains identity between the duplexed data 3a and 4a, and restores data in which an abnormality is detected. In the following explanations, the redundant data corresponding to the data 3a, viewed from the storage node 1, is the data 4a managed by the storage node 2, and the redundant data corresponding to the data 4a, viewed from the storage node 2, is the data 3a managed by the storage node 1.

The storage node 1 comprises a data access unit 1a, a management-information storing unit 1b, a data check unit 1c, a data acquisition unit 1d, and a data writing unit 1e. The data access unit 1a writes the data 3a in the storage device 3, and reads the data 3a from the storage device 3, in response to a data access request. In addition, when the data access unit 1a writes the data 3a, the data access unit 1a generates a check code based on the data 3a, and writes the check code in the storage device 3 in association with the data 3a.

The management-information storing unit 1b stores management information in which another storage node 2 managing the redundant data 4a (which is identical to data 3a stored in the local storage device 3 managed by the storage node 1) is registered.

When the data check unit 1c receives an instruction to check the data 3a in the storage device 3, the data check unit 1c reads out the data 3a from the storage device 3, and checks for the normality of the data 3a, for example, by confirming whether or not the data 3a can be normally read out and whether or not the consistency between the data 3a and the check code corresponding to the data 3a is preserved. For example, the instruction to check the data 3a is sent to the data check unit 1c from an administration node connected to the storage node 1 through a network. Alternatively, the instruction to check the data 3a may be manually inputted into the storage node 1 by a user so that the data check unit 1c can receive the instruction.

When the data check unit 1c detects an abnormality in the data 3a, the data acquisition unit 1d refers to the management information, and determines the storage node 2 to be paired with the storage node 1 in the duplexed system and store the redundant data 4a corresponding to the data 3a. In addition, the data acquisition unit 1d acquires the redundant data 4a (corresponding to the data 3a in which the abnormality is detected) from the storage node 2 (corresponding to the storage node 1 in the duplexed system). For example, the data acquisition unit 1d transmits to the storage node 2 a check-request message 5 which contains the data 3a and a flag indicating whether or not the data 3a is normal. Then, the data acquisition unit 1d receives a response message 6 which contains a flag indicating used data (which is actually stored by the storage node 2 in a storage area originally allocated for the redundant data 4a corresponding to the data 3a). In addition, when the used data is the redundant data 4a, the response message 6 further contains the data 4a. When the reading of the data 3a from the storage device 3 by the data check unit 1c fails, the data acquisition unit 1d inserts predetermined default data (instead of the data 3a) into the check-request message 5.

When the data check unit 1c detects an abnormality in the data 3a, the data writing unit 1e overwrites a storage area in the storage device 3 originally allocated for the data 3a with the redundant data 4a acquired by the data acquisition unit 1d. On the other hand, when the data 3a is determined to be normal, the data writing unit 1e overwrites the storage area in the storage device 3 originally allocated for the data 3a with the data 3a read out from the storage device 3. When the data 3a is determined to be abnormal, and the response message 6 indicates that the data 3a is used for overwriting the storage area originally allocated for the redundant data 4a (i.e., when the redundant data 4a is also abnormal), the data writing unit 1e overwrites the storage area in the storage device 3 originally allocated for the data 3a with the data 3a which is determined to be abnormal.

The storage node 2 comprises a data check unit 2a, a data writing unit 2b, and a data transmission unit 2c.

When the check-request message 5 indicates that the redundant data 3a is abnormal, the data check unit 2a reads out from the storage device 4 the data 4a corresponding to the redundant data 3a, and determines whether or not the data 4a is normal.

When the data 4a corresponding to the redundant data 3a contained in the check-request message 5 is normal, the data writing unit 2b overwrites with the data 4a the storage area in the storage device 4 originally allocated for the data 4a. When the data 4a corresponding to the redundant data 3a contained in the check-request message 5 is abnormal, the data writing unit 2b overwrites with the redundant data 3a the storage area in the storage device 4 originally allocated for the data 4a.

The data transmission unit 2c transmits the response message 6 to the storage node 1 (paired with the storage node 2 in the duplexed system), where the response message 6 contains data which is written in the storage device 4 by the data writing unit 2b on the basis of a determination made by the data writing unit 2b when the storage node 2 receives the check-request message 5.

That is, the distributed (duplexed) storage system having the above construction operates as follows.

When the data check unit 1c in the storage node 1 receives an instruction to check the data 3a in the storage device 3, the data check unit 1c reads out the data 3a from the storage device 3, and determines whether or not the data 3a is normal. When the data check unit 1c detects an abnormality in the data 3a, the data acquisition unit 1d refers to the management information, and determines the storage node 2 (paired with the storage node 1 in the duplexed system) to be a storage node storing the redundant data 4a corresponding to the data 3a (in which the abnormality is detected). Then, the data acquisition unit 1d transmits a check-request message 5 to the storage node 2. When the storage node 2 receives the check-request message 5, the data check unit 2a recognizes that the redundant data 3a is abnormal, reads out from the storage device 4 the data 4a corresponding to the redundant data 3a, and determines whether or not the data 4a is normal. When the data 4a is determined to be normal, the data writing unit 2b overwrites with the data 4a the storage area in the storage device 4 originally allocated for the data 4a. In addition, the data transmission unit 2c transmits a response message 6 to the storage node 1, where the response message 6 contains the data 4a which is written in the storage device 4 by the data writing unit 2b on the basis of the determination by the data writing unit 2b. Then, the data acquisition unit 1d in the storage node 1 acquires the redundant data 4a corresponding to the data, 3a from the storage node 2 through the response message 6, and the data writing unit 1e overwrites the storage area in the storage device 3 originally allocated for the data 3a with the data 4a acquired by the data acquisition unit 1d.

As explained above, in the above distributed storage system, every time an abnormality is detected in the data 3a, the data in which the abnormality is detected is immediately restored on a per-data access basis. Therefore, it is possible to suppress occurrence of data loss in the distributed storage system. In addition, even when the data 3a in the storage device 3 is normal, the check-request message 5 containing the data 3a is sent to the storage node 2, and the storage area in the storage device 4 originally allocated for the data 4a is overwritten with the data 3a. Thus, it is possible to preserve the identity between the data 3a and the data 4a, which constitute the duplexed data.

Although the functions of the storage nodes 1 and 2 are differently indicated in the example of FIG. 1, actually, the storage node 1 further comprises the functions of the storage node 2 explained with reference to FIG. 1, and the storage node 2 further comprises the functions of the storage node 1 explained with reference to FIG. 1. Therefore, when each of the storage nodes 1 and 2 receives an instruction to check data, the storage node behaves as the storage node 1 indicated in the example of FIG. 1. In addition, when each of the storage nodes 1 and 2 receives the check-request message 5 from the other storage node, the storage node behaves as the storage node 2 indicated in the example of FIG. 1.

However, in the most common distributed storage systems, identical data are stored in two nodes, and storage areas in the two nodes in which the identical data are stored are linked so that data for update are transmitted through the link. One of the storage areas is called the primary area, and the other is called the secondary area.

According to the present invention, each of a first storage node having a primary area and a second storage node having a secondary area cooperate with the other storage node on the basis of data managed by the other storage node as explained above. Therefore, when a bad block or abnormal data occurs in one of the primary and secondary areas, it is possible to correct the abnormal data or preserve the correct data. Hereinbelow, details of an embodiment of the distributed storage system according to the present invention are explained.

System Construction

Figure 2:
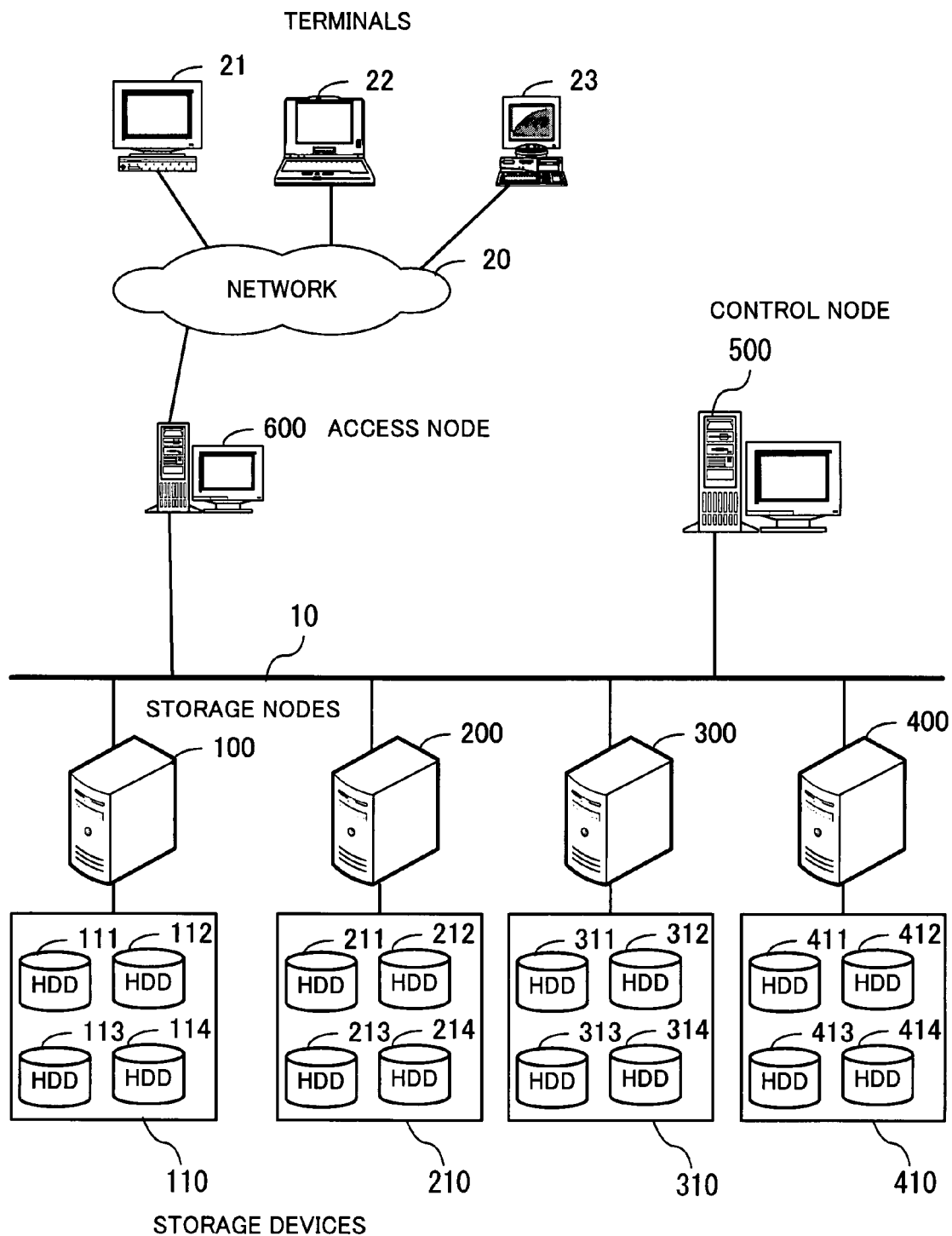
FIG. 2 is a diagram illustrating an example of a construction of a distributed storage system according to an embodiment of the present invention.

FIG. 2 is a diagram illustrating an example of a construction of a distributed storage system according to the embodiment of the present invention. In the system of FIG. 2, a plurality of storage nodes 100, 200, 300, and 400, a control node 500, and an access node 600 are connected through a network 10, and storage devices 110, 210, 310, and 410 are respectively connected to the storage nodes 100, 200, 300, and 400.

A plurality of hard disk drives (HDDs) 111, 112, 113, and 114 are installed in the storage device 110, a plurality of hard disk drives (HDDs) 211, 212, 213, and 214 are installed in the storage device 210, a plurality of hard disk drives (HDDs) 311, 312, 313, and 314 are installed in the storage device 310, and a plurality of hard disk drives (HDDs) 411, 412, 413, and 414 are installed in the storage device 410. In each of the storage devices 110, 210, 310, and 410, a RAID system is formed by using the HDDs installed in the storage device. According to the present embodiment, a RAID5 disk management service is realized in each of the storage devices 110, 210, 310, and 410.

The storage nodes 100, 200, 300, and 400 are computers, for example, having the Intel architecture (IA). Each of the storage nodes 100, 200, 300, and 400 manages data stored in one of the storage devices 110, 210, 310, and 410 connected to the storage node, and supplies the managed data to terminals 21, 22, and 23 through the network 10. In addition, the data managed by the storage nodes 100, 200, 300, and 400 have redundancy. That is, identical data are stored in at least two storage nodes. Further, the storage nodes 100, 200, 300, and 400 perform processing for preserving data duplexity (data-duplexity preservation processing) by checking the identity between the duplexed data. Each of the storage nodes 100, 200, 300, and 400 may perform the data-duplexity preservation processing in accordance with either its own judgement or external instructions. In the present embodiment, it is assumed that the data-duplexity preservation processing is performed in accordance with instructions from the control node 500. Hereinafter, the data-duplexity preservation processing is referred to as patrol processing.

In the patrol processing, storage nodes which store duplexed data communicate with each other, and the redundantly stored data are examined for the identity between redundantly stored data. When a defect is detected in data managed by a storage node, restoration of the data is performed by using the corresponding data managed by another-storage node.

The control node 500 controls the storage nodes 100, 200, 300, and 400. Specifically, the control node 500 outputs instructions for the patrol processing to the storage nodes 100, 200, 300, and 400.

The plurality of terminals 21, 22, and 23 are connected to the access node 600 through a network 20. The access node 600 recognizes the areas which are managed by the storage nodes 100, 200, 300, and 400 and in which the data are stored, and accesses the storage nodes 100, 200, 300, and 400 in response to requests from the terminals 21, 22, and 23.

Hardware Construction

Figure 3:
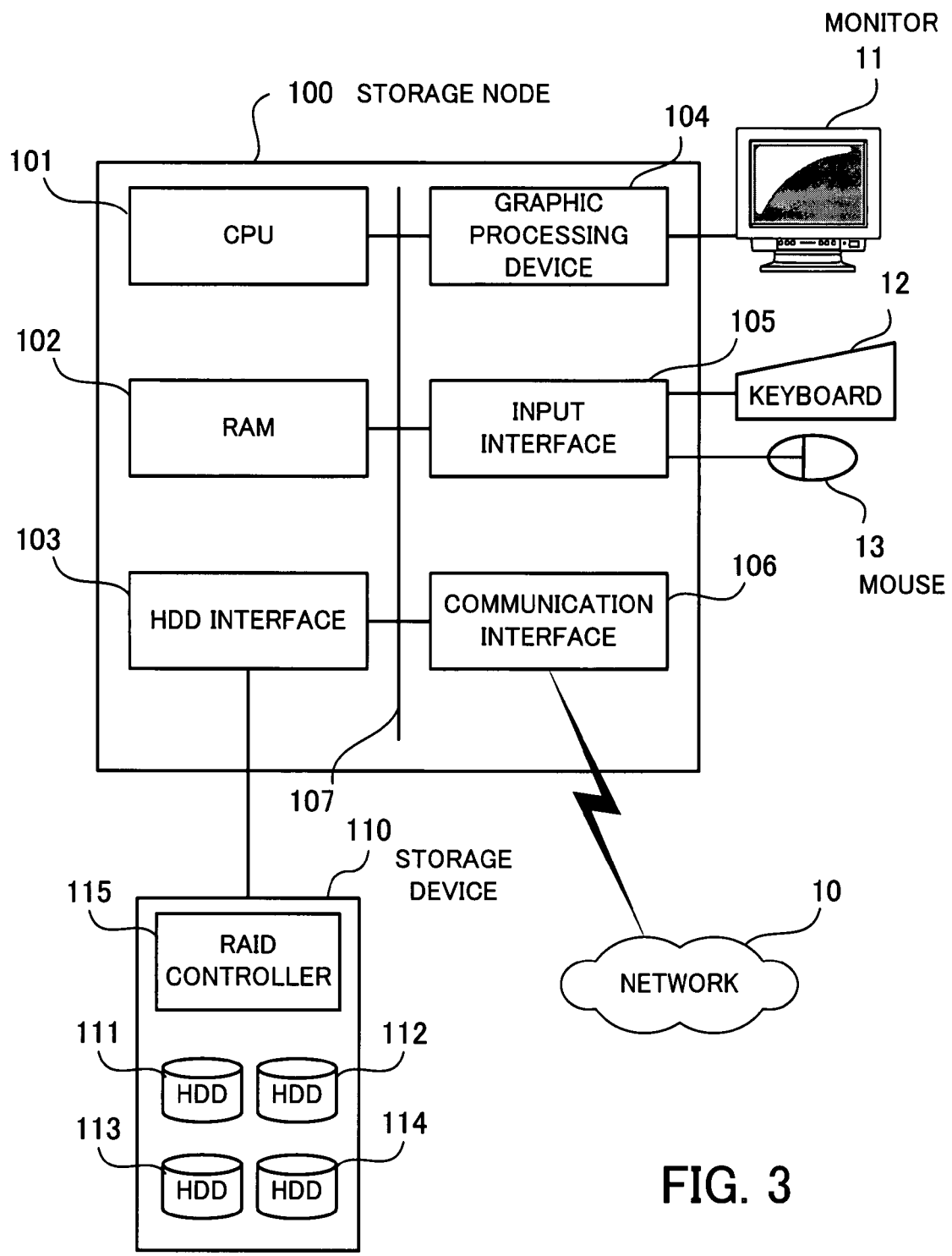
FIG. 3 is a diagram illustrating a hardware construction of a storage node used in the embodiment.

FIG. 3 is a diagram illustrating a hardware construction of each storage node used in the embodiment. The entire storage node 100 is controlled by a CPU (central processing unit) 101, to which a RAM (random access memory) 102, an HDD (hard disk drive) interface 103, a graphic processing device 104, an input interface 105, and a communication interface 106 are connected through a bus 107. The RAM 102 temporarily stores at least portions of an OS (operating system) program and application programs which are executed by the CPU 101, as well as various types of data necessary for processing by the CPU 101. The HDD interface 103 is connected to the storage device 110, which contains a plurality of hard disk drives (HDDs) 111 to 114 and a RAID controller 115. The HDD interface 103 communicates with the RAID controller 115. The RAID controller 115 has the functions of realizing the RAID0 to RAID5 management of the HDDs 111 to 114 so that the group of the HDDs 111 to 114 has an appearance of a single HDD. A monitor 11 is connected to the graphic processing device 104, which makes the monitor 11 display an image on a screen in accordance with an instruction from the CPU 101. A keyboard 12 and a mouse 13 are connected to the input interface 105, which transmits signals sent from the keyboard 12 and the mouse 13, to the CPU 101 through the bus 107. The communication interface 106 is connected to the network 10, and exchanges data with other computers through the network 10.

By using the above hardware construction, it is possible to realize the functions of the storage node 100 according to the present embodiment. In addition, the other storage nodes 200, 300, and 400 can have hardware constructions similar to the storage node 100 illustrated in FIG. 3, and the storage devices 210, 310, and 410 can also have hardware constructions similar to the storage device 110 illustrated in FIG. 3. Further, the control node 500, the access node 600, and the terminals 21, 22, and 23 can also be realized by using hardware constructions similar to the construction illustrated in FIG. 3. However, in the constructions of the control node 500, the access node 600, and the terminals 21, 22, and 23, a single HDD, instead of the RAID system realized by the storage device 110 of FIG. 3, may be connected to the HDD interface 103.

As illustrated in FIG. 2, the plurality of storage nodes 100, 200, 300, and 400 are connected to the network 10, and the storage nodes 100, 200, 300, and 400 can communicate with each other through the network 10, so that the distributed storage system behaves as a virtual volume when viewed from the terminals 21, 22, and 23. Hereinafter, the virtual volume is referred to as a logical volume.

Logical Volume

Figure 4:
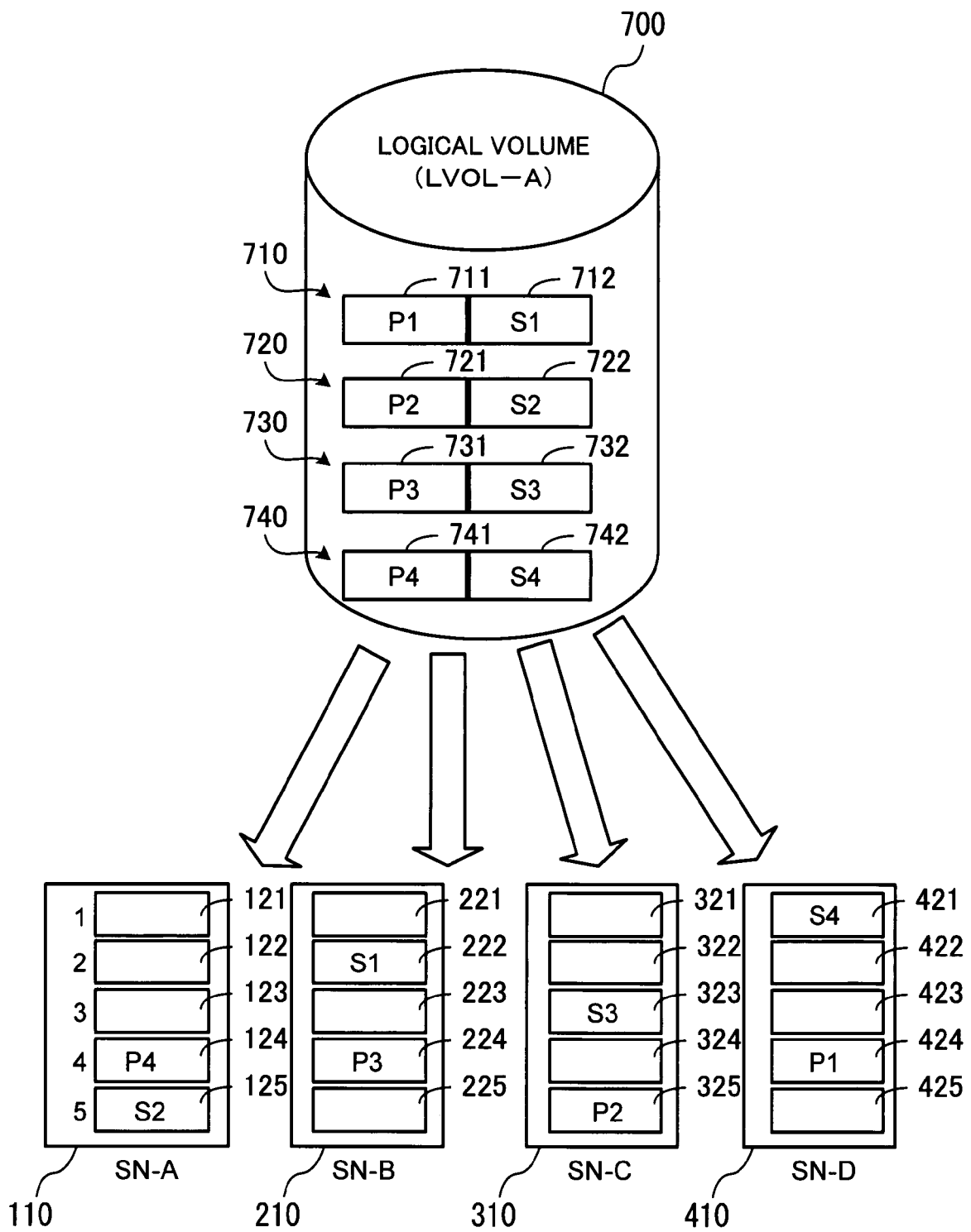
FIG. 4 is a diagram illustrating examples of a data structure of the logical volume, physical slices in the storage nodes, and the correspondences between the primary and secondary slices in the logical volume and the physical slices in the storage nodes.

FIG. 4 is a diagram illustrating examples of a data structure of the logical volume, physical slices in the storage nodes, and the correspondences between the primary and secondary slices in the logical volume and the physical slices in the storage nodes. In the examples of FIG. 4, the logical-volume identifier "LVOL-A" is assigned to the logical volume 700, and the storage-node identifiers "SN-A," "SN-B," "SN-C," and "SN-D" are respectively assigned to the storage nodes 100, 200, 300, and 400. A RAID5 logical disk is realized in each of the storage devices 110, 210, 310, and 410 managed by the storage nodes 100, 200, 300, and 400. The RAID5 logical disk is divided into five slices, which are managed by the corresponding storage node. That is, the data in each of the storage devices 110, 210, 310, and 410 are stored and managed in physical slices. Specifically, the storage area in the storage device 110 is divided into five physical slices 121 to 125, the storage area in the storage device 210 is divided into five physical slices 221 to 225, the storage area in the storage device 310 is divided into five physical slices 321 to 325, and the storage area in the storage device 410 is divided into five physical slices 421 to 425. The logical volume 700 is constituted by the segments 710, 720, 730, and 740, each of which has a storage capacity corresponding to the storage capacity of each physical slice in the storage devices 110, 210, 310, and 410. For example, when the storage capacity of the physical slice is 1 GB (gigabyte), the storage capacity of each slice in the segment is also 1 GB. The storage capacity of the logical volume 700 is an integer multiple of the storage capacity of the segment. For example, when the storage capacity of the segment is 1 GB (gigabyte), the storage capacity of the logical volume 700 is also 4 GB.

The segment 710 is constituted by a primary slice 711 and a secondary slice 712, the segment 720 is constituted by a primary slice 721 and a secondary slice 722, the segment 730 is constituted by a primary slice 731 and a secondary slice 732, and the segment 740 is constituted by a primary slice 741 and a secondary slice 742. The slices in each segment belong to different storage nodes. A management area allocated for managing each slice contains the identifier of the logical volume (logical-volume identifier), information on the segment (segment information), information on slices constituting the segment (slice information), and a flag. For example, the flag indicates a primary slice or a secondary slice.

In the example of FIG. 4, each slice is identified by a combination of the character "P" or "S" and a number, where the character "P" indicates that the slice is a primary slice, the character "S" indicates that the slice is a secondary slice, and the number following the character "P" or "S" indicates the ordinal position of the segment. For example, the primary slice 711 and the secondary slice 712 in the first segment 710 are respectively indicated by "P1" and "S1."

Each of the primary slices and the secondary slices in the logical volume 700 having the above structure is associated with one of physical slices in the storage devices 110, 210, 310, and 410. For example, the primary slice 711 in the segment 710 is associated with the physical slice 424 in the storage device 410, and the secondary slice 712 in the segment 710 is associated with the physical slice 222 in the storage device 210. Therefore, the storage devices 110, 210, 310, and 410 store the data of the primary and secondary slices in the corresponding physical slices in the storage devices.

Functions of the System

Figure 5:
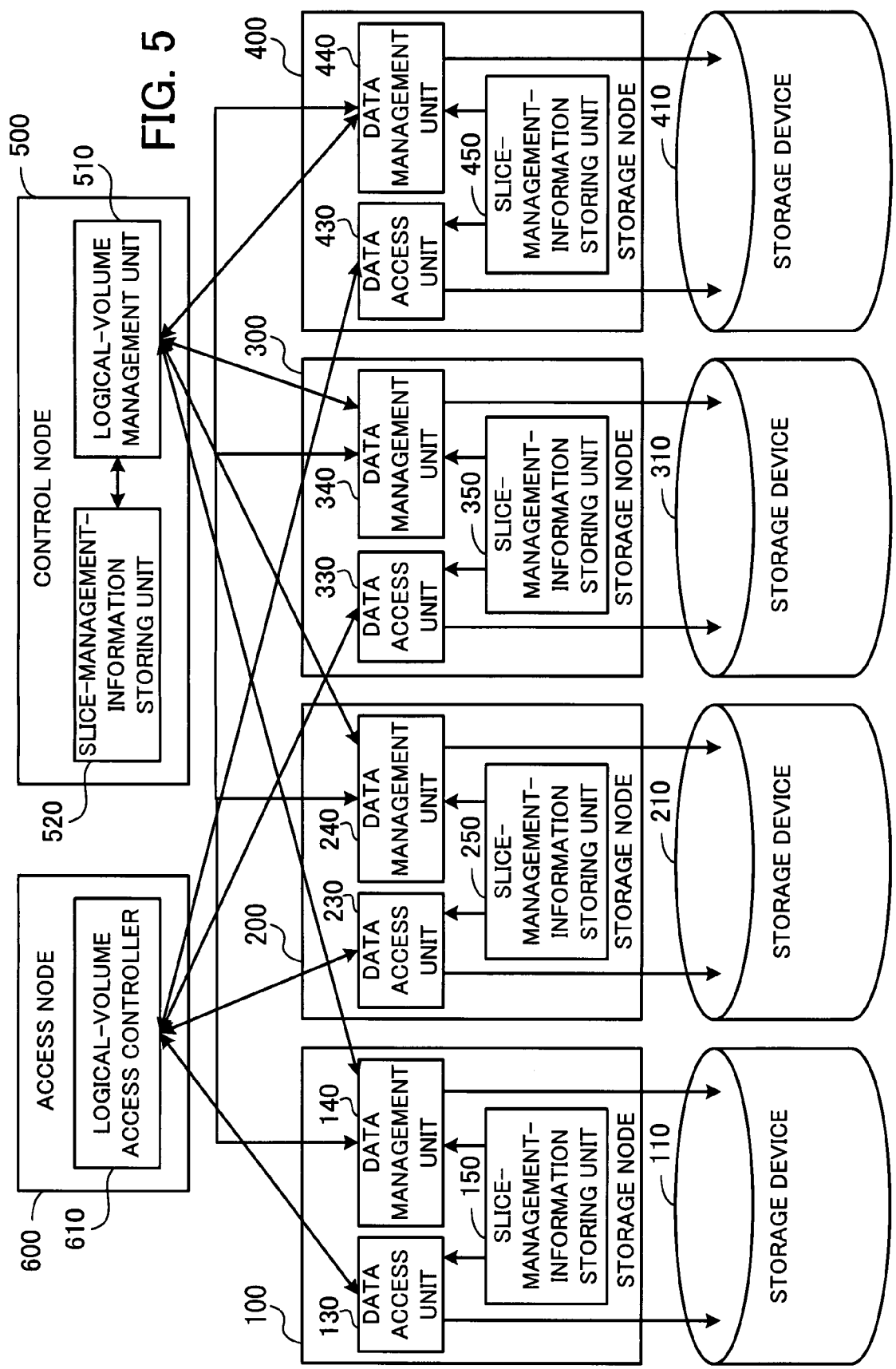
FIG. 5 is a block diagram illustrating the functions of respective devices constituting the distributed storage system.

FIG. 5 is a block diagram illustrating the functions of the respective devices constituting the distributed storage system. The access node 600 comprises a logical-volume access controller 610. When the distributed storage system receives from the terminals 21, 22, and 23 an access request to access data in the logical volume 700, the logical-volume access controller 610 accesses the data in a storage node managing the data. Specifically, the logical-volume access controller 610 memorizes the correspondences between the primary and secondary slices in each segment in the logical volume 700 and the physical slices in the storage devices 110, 210, 310, and 410. When the distributed storage system receives from the terminals 21, 22, and 23 an access request to access data in a segment of the logical volume 700, the logical-volume access controller 610 accesses data in a storage device having a physical slice corresponding to the primary slice in the segment.

The control node 500 comprises a logical-volume management unit 510 and a slice-management-information storing unit 520. The logical-volume management unit 510 manages the physical slices in the storage devices 110, 210, 310, and 410 controlled by the storage nodes 100, 200, 300, and 400. For example, the logical-volume management unit 510 sends to the storage nodes 100, 200, 300, and 400 a request to acquire information for management of the slices (slice-management information) on system start-up. When the logical-volume management unit 510 receives a response to the request together with the information for management of the slices, the logical-volume management unit 510 stores the received information in the slice-management-information storing unit 520. In addition, the logical-volume management unit 510 controls the timings of the patrol processing for each segment in the logical volume 700. The patrol processing may be performed at predetermined time intervals or at prescheduled timings. Further, it is possible to monitor the load imposed on the distributed storage system, and perform the patrol processing when the load is not heavy. At the timings at which the patrol processing is to be performed, the logical-volume management unit 510 sends an instruction to perform the patrol processing, to a storage node managing the primary slice in the segment of which the patrol processing is to be performed.

The slice-management-information storing unit 520 stores the slice-management information acquired from the storage nodes 100, 200, 300, and 400, and can be realized by a storage device. For example, a portion of the storage area in a RAM in the control node 500 is used for the slice-management-information storing unit 520.

The storage node 100 comprises a data access unit 130, a data management unit 140, and a slice-management-information storing unit 150.

The data access unit 130 accesses data in the storage device 110 in response to a request from the access node 600. Specifically, when the storage node 100 receives from the access node 600 a request to read data (data-read request), the data access unit 130 acquires from the storage device 110 the data designated in the data-read request, and sends the acquired data to the access node 600. In addition, when storage node 100 receives a request to write data (data-write request), the data access unit 130 stores in the storage device 110 the data contained in the data-write request.

As mentioned before, the storage node 100 manages the storage areas in the storage device 110 on a slice-by-slice basis. Each slice includes areas allocated for storing check codes for respective blocks as well as an area allocated for storing real data. When data are written into a slice in storage device 110, the data access unit 130 calculates a check code for the data and stores the check code into the slice.

According to the present embodiment, check codes are stored in the slices. Alternatively, the check codes may be stored outside the slices. However, in the following explanations, the storage capacity for the check codes is not included in the storage capacities of the slices. According to the present embodiment, it is assumed that an 8-byte check code is attached to each block. Although it is necessary to secure an area for storing the 8-byte check code in some position on a disk, the area for storing the 8-byte check code is not included in the slice size in the following explanations.

An example of calculation of a check code is indicated below. In the following example, it is assumed that the capacity of each block is 512 bytes, and an 8-byte check code is calculated from the 512-byte data. An algorithm for computing the check code is described in the C language below. In the algorithm, it is assumed that the 512-byte data is stored as an array data[ ], the calculated check code is finally obtained as an array cc[ ], and the size of each element of the arrays is 1 byte.

```
cc[0]=cc[1]=cc[2]=cc[3]=cc[4]=cc[5]=cc[6]=cc[7]=0;
for(i=0;i<512;i+=8) {
  cc[0]^=data[i];
  cc[1]^=data[i+1];
  cc[2]^=data[i+2];
  cc[3]^=data[i+3];
  cc[4]^=data[i+4];
  cc[5]^=data[i+5];
  cc[6]^=data[i+6];
  cc[7]^=data[i+7];
}
```

In the first line of the above algorithm, the eight byte check code is initialized. In this example, the initial values of the eight bytes of the check code are all zero. The for statement in the second line indicates that the variable i is an integer indicating the number of bytes counted from the top of the block, the initial value of the variable i is zero, the variable i is incremented by eight every time the assignments in the third to tenth lines are performed, and the assignments in the third to tenth lines are repeated until the variable i reaches 512. According to the assignments in the third to tenth lines, the i-th to (i+7)-th bytes in the block are extracted, and exclusive ORs of the i-th to (i+7)-th bytes and the first to eighth elements of the array cc[ ] are calculated and substituted in the first to eighth elements of the array cc[ ], respectively. The check code is obtained from the elements of the array cc[ ] when the above for-loop operation is completed. When data is updated, the corresponding check code is also written in the storage device 110.

The data management unit 140 manages the data stored in the storage device 110. Specifically, the data management unit 140 performs patrol processing of the data stored in the storage device 110 in accordance with instructions from the control node 500. In order to perform the patrol processing, the data management unit 140 sends a check-request message to another storage node which manages the secondary slice corresponding to the primary slice to be checked. When the storage node 100 receives a check-request message from another storage node, the data management unit 140 performs patrol processing of data in a slice designated by the check-request message. Further, when the storage node 100 receives a request to acquire information for management of slices (slice-management information) from the logical-volume management unit 510, the data management unit 140 sends to the logical-volume management unit 510 the slice-management information stored in the slice-management-information storing unit 150.

The slice-management-information storing unit 150 stores the slice-management information, and can be realized by a storage device. For example, a portion of the storage area in the RAM 102 in the storage node 100 is used as the slice-management-information storing unit 150. The slice-management information stored in the slice-management-information storing unit 150 is written in the storage device 110 when the system is stopped, and read from the storage device 110 into the slice-management-information storing unit 150 when the system is started.

The other storage nodes 200, 300, and 400 have similar functions to the storage node 100. That is, the storage node 200 comprises a data access unit 230, a data management unit 240, and a slice-management-information storing unit 250, the storage node 300 comprises a data access unit 330, a data management unit 340, and a slice-management-information storing unit 350, and the storage node 400 comprises a data access unit 430, a data management unit 440, and a slice-management-information storing unit 450. In each of the storage nodes 200, 300, and 400, each function having the same name as one of the functions of the storage node 100 has a similar function to the one of the functions of the storage node 100.

Slice-Management Information

Figure 6:
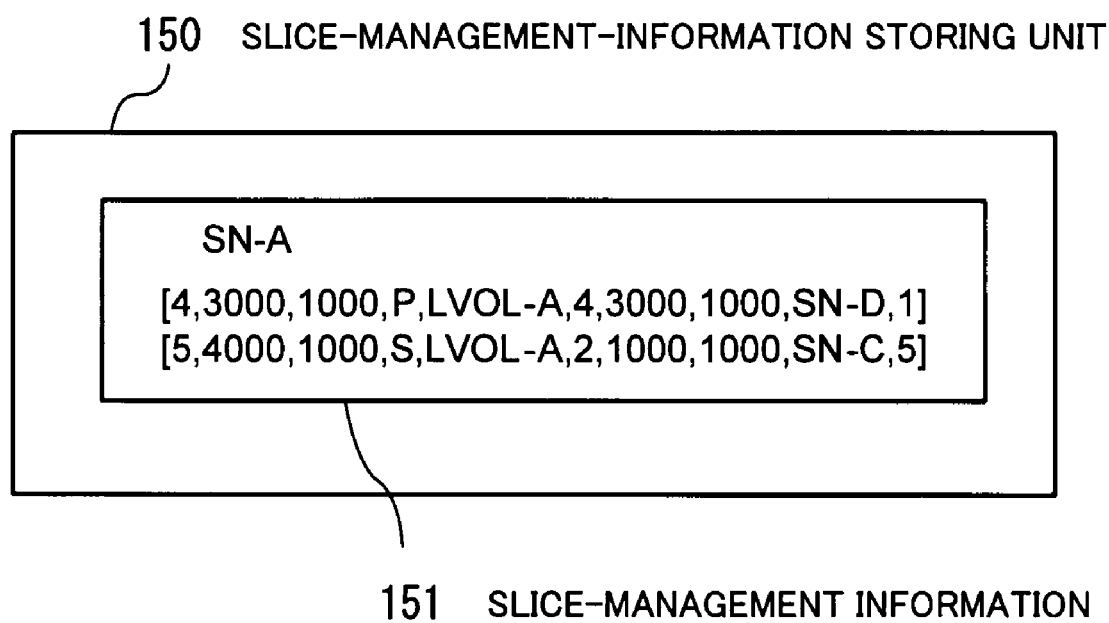
FIG. 6 is a diagram illustrating an example of a data structure of slice-management information.

FIG. 6 is a diagram illustrating an example of a data structure of slice-management information. As illustrated in FIG. 6, the slice-management-information storing unit 150 stores slice-management information 151. In the example of FIG. 6, the slice-management information 151 is labeled with the storage-node identifier "SN-A" of the storage node 100, and includes two sets of slice-management information for the two slices in which data are stored. Each set contains the slice number, the number indicating the position of the leading block in the slice, the number of blocks in the slice, the flag indicating a primary slice or a secondary slice, the logical-volume identifier, the segment number, the number indicating the position of the leading block in the logical volume, the number of blocks in the logical volume, the identifier of the storage node which is paired with the storage node SN-A, and the number indicating the physical slice which is paired with the physical slice corresponding to the set of slice-management information, in this order. The slice-management information 151 illustrated in FIG. 6 indicates the state of the storage device 110 illustrated in FIG. 4. For example, the set of slice-management information for the physical slice of the slice number "4" indicates that the physical slice of the slice number "4" in the storage node of the identifier "SN-A" is the primary slice in the segment "4" in the logical volume "LVOL-A," and paired with the physical slice of the slice number "1" in the storage node of the identifier "SN-D."

Further, similar slice-management information is also stored in the slice-management-information storing units 250, 350, and 450 in the storage nodes 200, 300, and 400. The control node 500 collects the slice-management information from the storage nodes 100, 200, 300, and 400 and stores the slice-management information in the slice-management-information storing unit 520 on system start-up.

Figure 7:
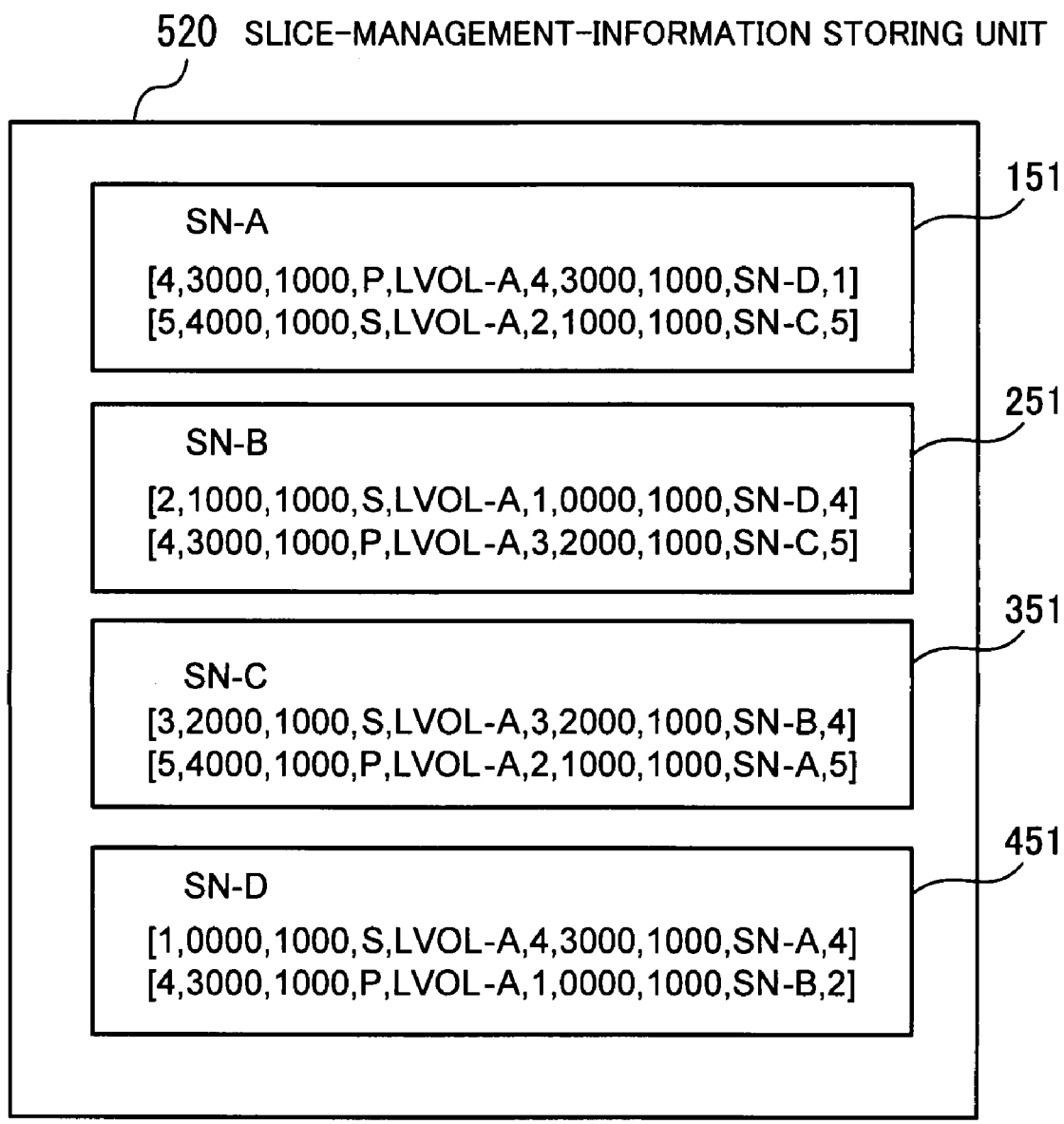
FIG. 7 is a diagram illustrating an example of a data structure in a slice-management-information storing unit.

FIG. 7 is a diagram illustrating an example of a data structure in the slice-management-information storing unit 520. The slice-management-information storing unit 520 stores the collected slice-management information 151, 251, 351, and 451. The slice-management information 151 is acquired from the storage node 100 having the identifier "SN-A," the slice-management information 251 is acquired from the storage node 200 having the identifier "SN-B," the slice-management information 351 is acquired from the storage node 300 having the identifier "SN-C," the slice-management information 451 is acquired from the storage node 400 having the identifier "SN-D."

The patrol processing of the storage nodes 100, 200, 300, and 400 is performed in the distributed storage system having the above construction in accordance with an instruction from the control node 500.

Patrol Processing

Figure 8:
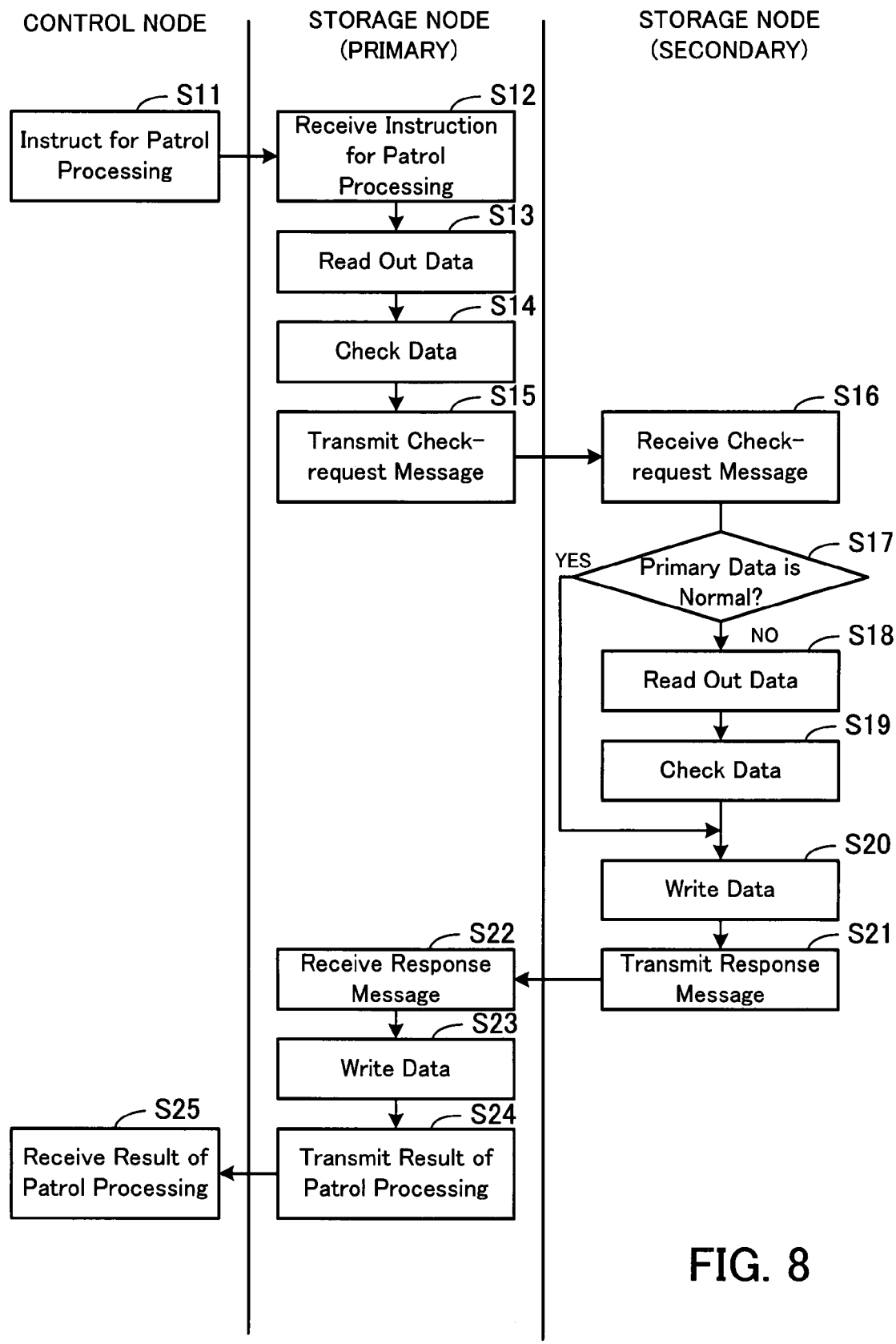
FIG. 8 is a sequence diagram indicating an outline of a sequence of patrol processing.

Hereinbelow, an outline of a sequence of patrol processing is explained with reference to FIG. 8, which is a sequence diagram indicating the outline of the sequence of the patrol processing. The patrol processing is performed on a segment-by-segment basis in the logical volume 700. In the exemplary case explained below, the storage node 100 manages the primary slice 741, the storage node 400 manages the secondary slice 742, and the patrol processing of the segment 740 constituted by the primary and secondary slices 741 and 742 (as illustrated in FIG. 4) is performed. The processing indicated in FIG. 8 is explained below step by step.

<Step S11> At the timing at which the patrol processing of the segment 740 is to be performed, the logical-volume management unit 510 in the control node 500 sends to the storage node 100 managing the primary slice 741 an instruction to perform the patrol processing of the primary slice 741.

<Step S12> The data management unit 140 in the storage node 100 receives the instruction from the control node 500. Thereafter, the storage node 100 controls the patrol processing of the segment 740 containing the primary slice 741.

<Step S13> The data management unit 140 reads out data from the area of the physical slice 124 (illustrated in FIG. 4) corresponding to the primary slice 741. At this time, the unit size of data which is read out in one operation is not necessarily the size of the slice, and may be smaller than the size of the slice. In this example, the data is read out from the physical slice 124 in blocks of 512 bytes.

<Step S14> The data management unit 140 checks the data read out from the physical slice 124. Specifically, when the data management unit 140 reads out the data, the data management unit 140 also reads out from the storage device 110 the check code corresponding to the data. In addition, the data management unit 140 recalculates the check code on the basis of the data read out from the physical slice 124. Then, the data management unit 140 compares the recalculated check code with the check code read out from the storage device 110. When the data management unit 140 fails to read out the data or the check code and the block storing the data or the check code is determined to be a bad block, or when the recalculated check code is not identical to the check code read out from the storage device 110, the data management unit 140 determines that the data readout from the relevant portion of the physical slice 124 is abnormal.

<Step S15> The data management unit 140 transmits a check-request message to the storage node 400 managing the secondary slice 742. When the data can be read out in step S13, the check-request message contains the data read out from the physical slice 124.

<Step S16> The data management unit 440 in the storage node 400 receives the check-request message.

<Step S17> The data management unit 440 determines whether or not the result of the checking of the data read out from the physical slice 124 corresponding to the primary slice 741, which is obtained in step S14, is satisfactory. When the checking result is satisfactory, the operation goes to step S20. When the checking result is not satisfactory, the operation goes to step S18.

<Step S18> The data management unit 440 reads out data from the physical slice 421 corresponding to the secondary slice 742 in the storage device 410.

<Step S19> The data management unit 440 checks for consistency in the data read out from the physical slice 421.

<Step S20> The data management unit 440 writes data in the physical slice 421. At this time, the data read out from the physical slice 124 corresponding to the primary slice 741 is written in the physical slice 421 when the data is normally read out from the physical slice 124 and the result of the consistency checking of the data is satisfactory. When the data corresponding to the primary slice 741 is not normally read out from the physical slice 124 or the result of the consistency checking of the data corresponding to the primary slice 741 is not satisfactory, and the result of the consistency checking of the data corresponding to the secondary slice 742 is satisfactory, the data read out from corresponding to the secondary slice 742 is written in the physical slice 421. When both of the data corresponding to the primary slice 741 and the data corresponding to the secondary slice 742 are normally read out and fail in the consistency checking, the data corresponding to the primary slice 741 is written in the physical slice 421.

<Step S21> The data management unit 440 sends a response message to the storage node 100 which manages the physical slice 124 corresponding to the primary slice 741. When the data corresponding to the secondary slice 742 is written in the physical slice 421 in step S20, the data is contained in the response message.

<Step S22> The data management unit 140 in the storage node 100 receives the response message.

<Step S23> The data management unit 140 writes data identical to the data written in the physical slice 421 in step S20, in the physical slice 124 corresponding to the primary slice 741 in the storage device 110.

<Step S24> The data management unit 140 sends the result of the patrol processing to the control node 500.

<Step S25> The logical-volume management unit 510 in the control node 500 receives from the data management unit 140 the result of the patrol processing.

Thus, the patrol processing is completed. Next, the formats of the check-request message and the response message are indicated.

Check-Request Message

Figure 9:
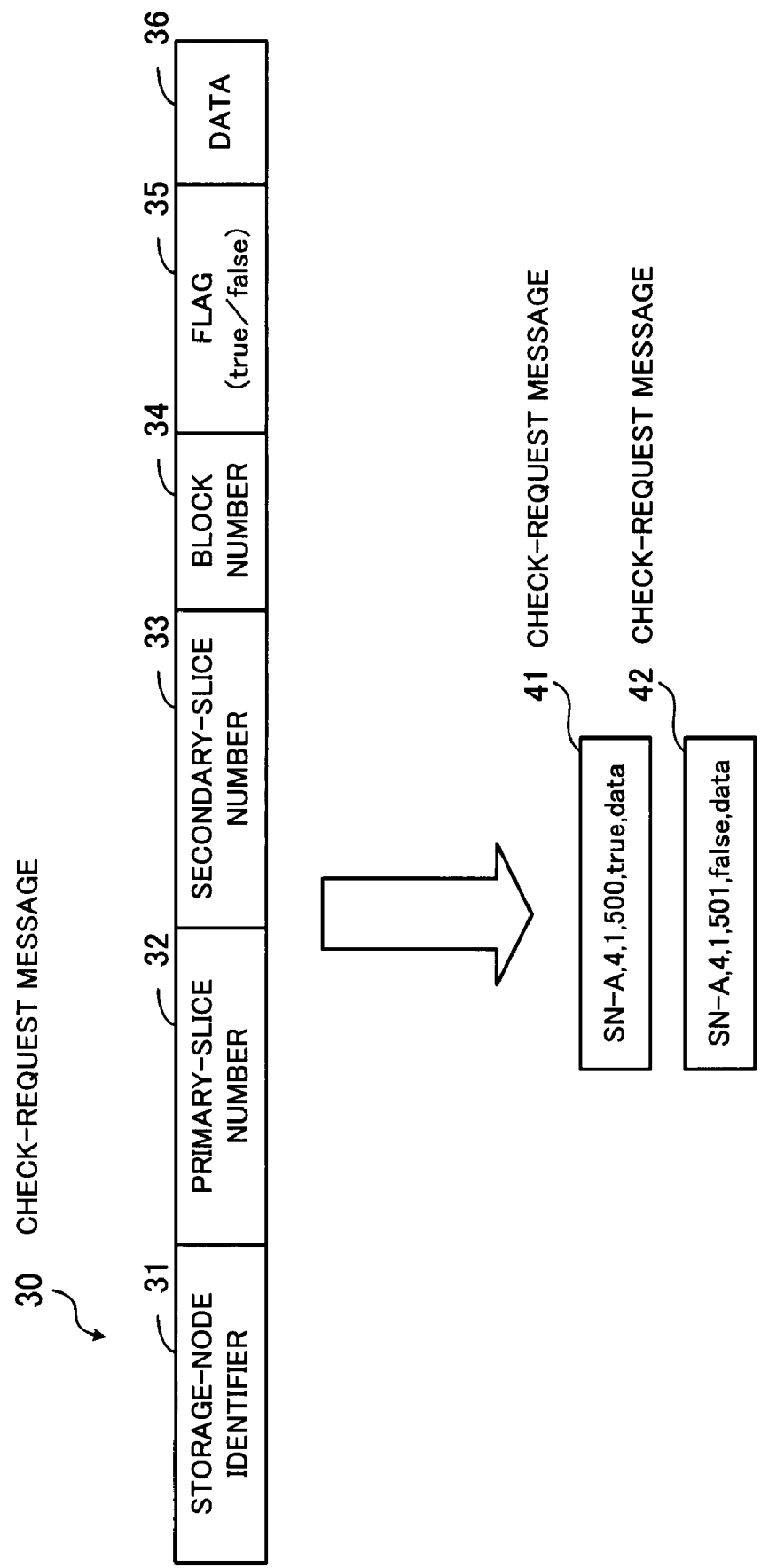
FIG. 9 is a diagram indicating a format of a check-request message.

FIG. 9 is a diagram indicating an exemplary format of the check-request message. The check-request message is a message sent from a first storage node managing a first physical slice corresponding to a primary slice (in a segment subject to the patrol processing) to a second storage node managing a second physical slice corresponding to a secondary slice (in the segment). The format 30 of the check-request message illustrated in FIG. 9 has six fields 31 to 36. The first field 31 contains the storage-node identifier of the first storage node managing the first physical slice corresponding to the primary slice (i.e., the identifier of the storage node which transmits data). The second field 32 contains as a primary-slice number a number indicating the first physical slice being managed by the first storage node and corresponding to the primary slice. The third field 33 contains as a secondary-slice number a number indicating the second physical slice being managed by the second storage node and corresponding to the secondary slice. The fourth field 34 contains as a block number an ordinal number indicating a block from which a reading operation is performed. The fifth field 35 contains a flag indicating whether or not the reading operation from the block in the first physical slice (being managed by the first storage node and corresponding to the primary slice) is normal. When the reading operation from the block is normal and the result of the consistency checking of the data read out from the first physical slice is satisfactory, "true" is set in the flag. When the reading operation from the block is not normal (for example, due to a media error), or the result of the consistency checking of the data read out from the first physical slice is not satisfactory, "false" is set in the flag. The sixth field 36 contains the data read out from the first physical slice. When data cannot be read out from the first physical slice (being managed by the first storage node and corresponding to the primary slice), default data is set in the field 36.

FIG. 9 further shows concrete examples 41 and 42 of the check-request message. The check-request messages 41 and 42 are sent from the storage node 100 of the storage-node identifier "SN-A" to the storage node 400 of the storage-node identifier "SN-D." The check-request message 41 shows that the reading operation from the block of the block number "500" is normal ("true"), and the check-request message 42 shows that the reading operation from the block of the block number "501" is not normal ("false"). Since the check-request message 42 contains the flag "false," the default data is contained in the field 36 in the check-request message 42.

Response Message

Figure 10:
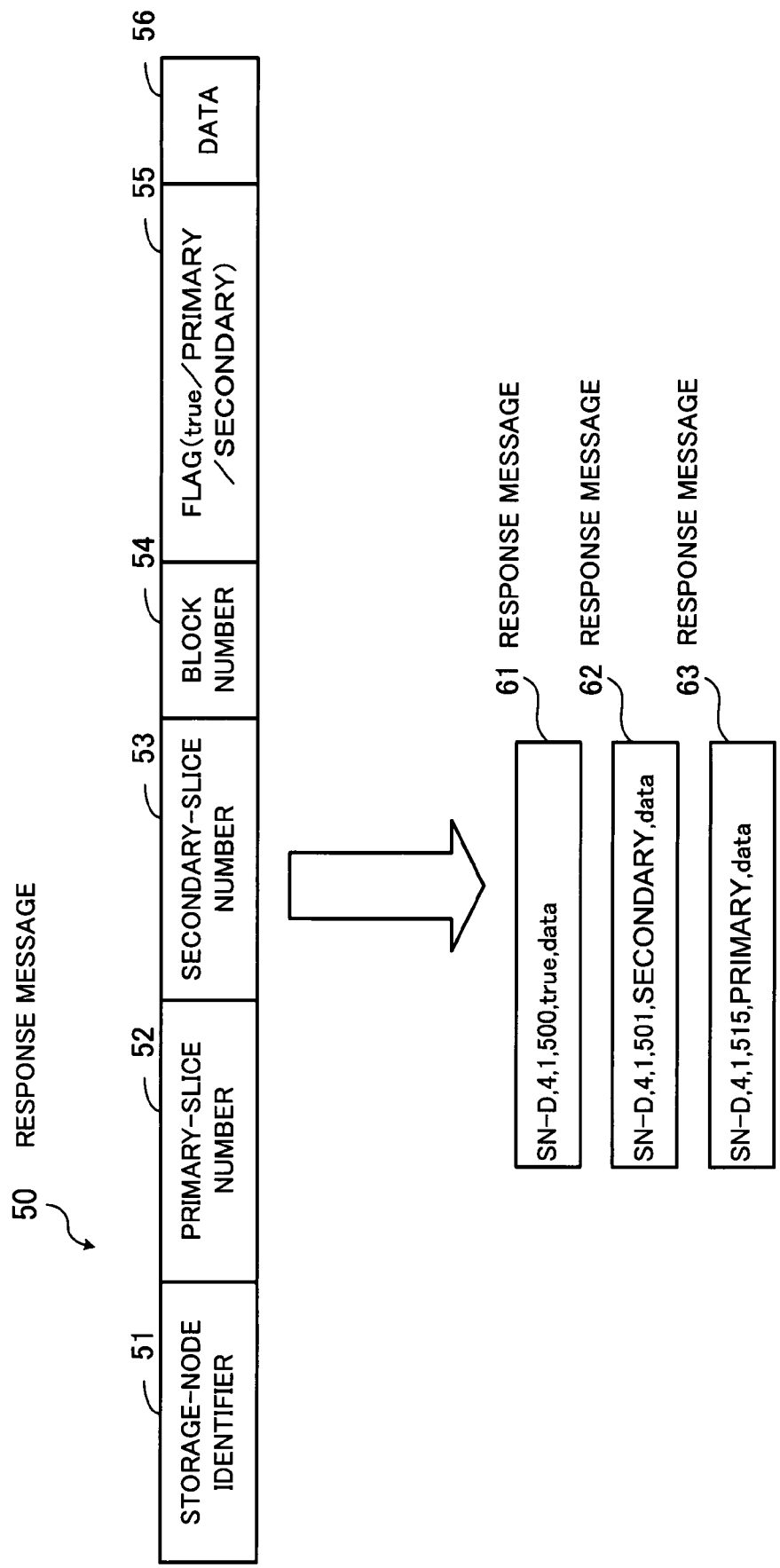
FIG. 10 is a diagram indicating a format of a response message.

FIG. 10 is a diagram indicating an exemplary format of the response message. The response message is a message sent from the second storage node (managing the second physical slice corresponding to the secondary slice in the segment subject to the patrol processing) to the first storage node (managing the first physical slice corresponding to the primary slice in the segment). The format 50 of the response message illustrated in FIG. 10 has six fields 51 to 56. The first field 51 contains the storage-node identifier of the second storage node which manages the secondary slice (i.e., the identifier of the storage node which transmits data). The second field 52 contains the primary-slice number i.e., the number indicating the first physical slice (being managed by the first storage node and corresponding to the primary slice in the segment). The third field 53 contains the secondary-slice number, i.e., the number indicating the second physical slice (being managed by the second storage node and corresponding to the secondary slice in the segment). The fourth field 54 contains the block number, i.e., the ordinal number indicating the block from which the reading operation is performed. The fifth field 55 contains a flag indicating the data which is written in the second physical slice. When the data which is read out from the first physical slice and determined to be normal is written in the second physical slice, "true" is set in the flag in the fifth field 55. When the data which is read out from the first physical slice and is not determined to be normal is written in the second physical slice, "PRIMARY" is set in the flag in the fifth field 55. When the data which is read out from the second physical slice is written in the second physical slice, "SECONDARY" is set in the flag in the fifth field 55. The sixth field 56 contains the data written in the second physical slice.

FIG. 10 further shows concrete examples 61 to 63 of the response message. The response messages 61 to 63 are sent from the storage node 400 of the storage-node identifier "SN-D" to the storage node 100 of the storage-node identifier "SN-A." The response message 61 shows that the data read out from the block of the block number "500" in the first physical slice and determined to be normal is written in the corresponding block of the block number "500" in the second physical slice, the response message 62 shows that the data read out from the block of the block number "501" in the second physical slice and determined to be normal is written in the block of the block number "501" in the second physical slice, and the response message 63 shows that the data read out from the block of the block number "515" in the first physical slice and determined to be abnormal is written in the corresponding block of the block number "515" in the second physical slice.

Patrol Processing of Primary Slice

Next, the patrol processing and a mechanism for maintaining the duplexity of data are explained below from the viewpoints of a storage node managing a primary slice and a storage node managing a secondary slice. In the exemplary case explained below, the storage node of the identifier "SN-A" performs the patrol processing of the physical slice of the identifier "4" which is managed by the storage node "SN-A."

Figure 11:
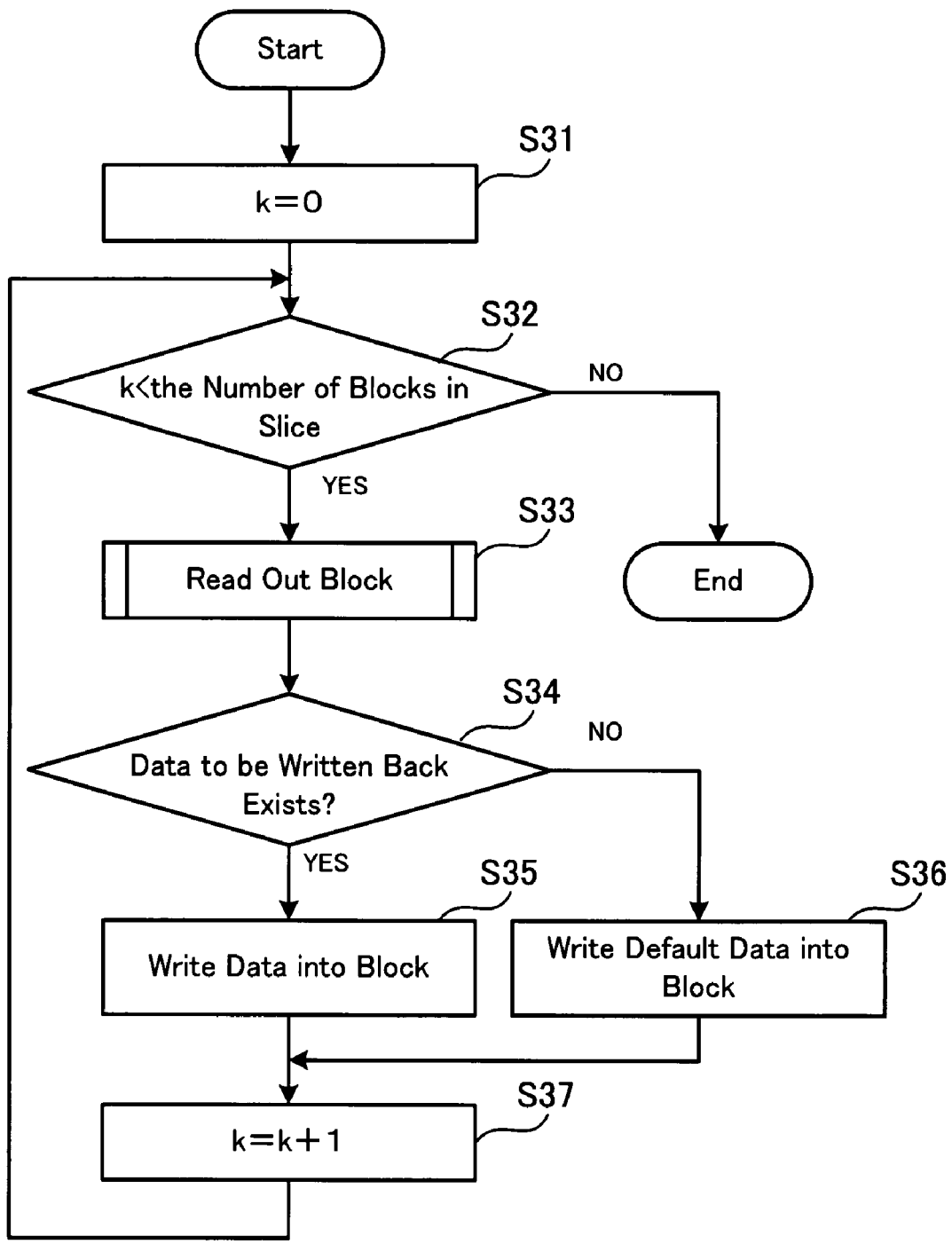
FIG. 11 is a flow diagram indicating a sequence of patrol processing of data in a primary slice.

FIG. 11 is a flow diagram indicating a sequence of the patrol processing of data in the primary slice. The processing indicated in FIG. 11 is explained below step by step.

<Step S31> The data management unit 140 sets the variable k to "0." The variable k is a count indicating an ordinal number indicating the position of a block in the physical slice to be processed.

<Step S32> The data management unit 140 determines whether or not the variable k is smaller than the total number of the blocks in the physical slice. In this example, the total number of the blocks in the physical slice is 1,000. When the variable k does not reach the value corresponding to the total number of the blocks in the physical slice, the processing of FIG. 11 is completed.

<Step S33> The data management unit 140 reads out data in the block. Details of the processing in step S33 (which is hereinafter referred to as the block-read processing) are explained later.

<Step S34> The data management unit 140 determines whether or not data to be written back into the position from which the data is read out is obtained in step S33. The determination is made as follows.

When the data is normally read out from one of the primary and secondary slices, the data normally read out is the data to be written back. When the data is normally read out from both of the primary and secondary slices, the data normally read out from the primary slice is preferentially chosen as the data to be written back. That is, when the data in the block in the primary slice is normally read out in step S33, the data normally read out from the primary slice is used as the data to be written back. When the data in the block in the primary slice is not normally read out and the data in the corresponding block in the secondary slice is normally read out in step S33, the data normally read out from the corresponding block in the secondary slice is used as the data to be written back.

When data is normally read out from neither of the block in the primary slice and the corresponding block in the secondary slice in step S33, the data to be written back is determined in the following priority order.

(1) When the data in the block in the primary slice is read out, and the data is abnormal (e.g., the result of the consistency checking is not satisfactory), the data read out from the block in the primary slice is used as the data to be written back.

(2) When the data in the block in the primary slice cannot be read out, and the data in the corresponding block in the secondary slice can be read out, the data read out from the block in the secondary slice is used as the data to be written back.

(3) When the data can be read out from neither of the block in the primary slice and the corresponding block in the secondary slice in step S33, the data management unit 140 determines that the data to be written back is not obtained in step S33.

When the data to be written back into the position from which the data is read out is obtained, the operation goes to step S35. When the data to be written back is not obtained, the operation goes to step S36.

<Step S35> The data management unit 140 writes the data to be written back, into the k-th block in the primary slice, and thereafter the operation goes to step S37.

According to the present embodiment, even when the data to be written back is the data read out from the primary slice, the data is actually written back into the primary slice in order to access an area for storing parity data. Since the storage device 110 has the RAID5 structure, the area for storing the parity data is not accessed by the data reading operation. When a data writing operation is performed, parity data is produced in the storage device 110, and written in the area for storing the parity data. That is, write access to the area for storing the parity data is performed when a data writing operation is performed. Therefore, when a trouble occurs in the area for storing the parity data and impedes the data writing operation, the trouble can be detected during the patrol processing.

<Step S36> Since the data to be written back is not obtained in step S33, the data management unit 140 writes default data, as the data to be written back, in the k-th block in the primary slice.

<Step S37> The data management unit 140 increments the variable k by one, and the operation goes to step S32.

Block-Read Processing

Figure 12:
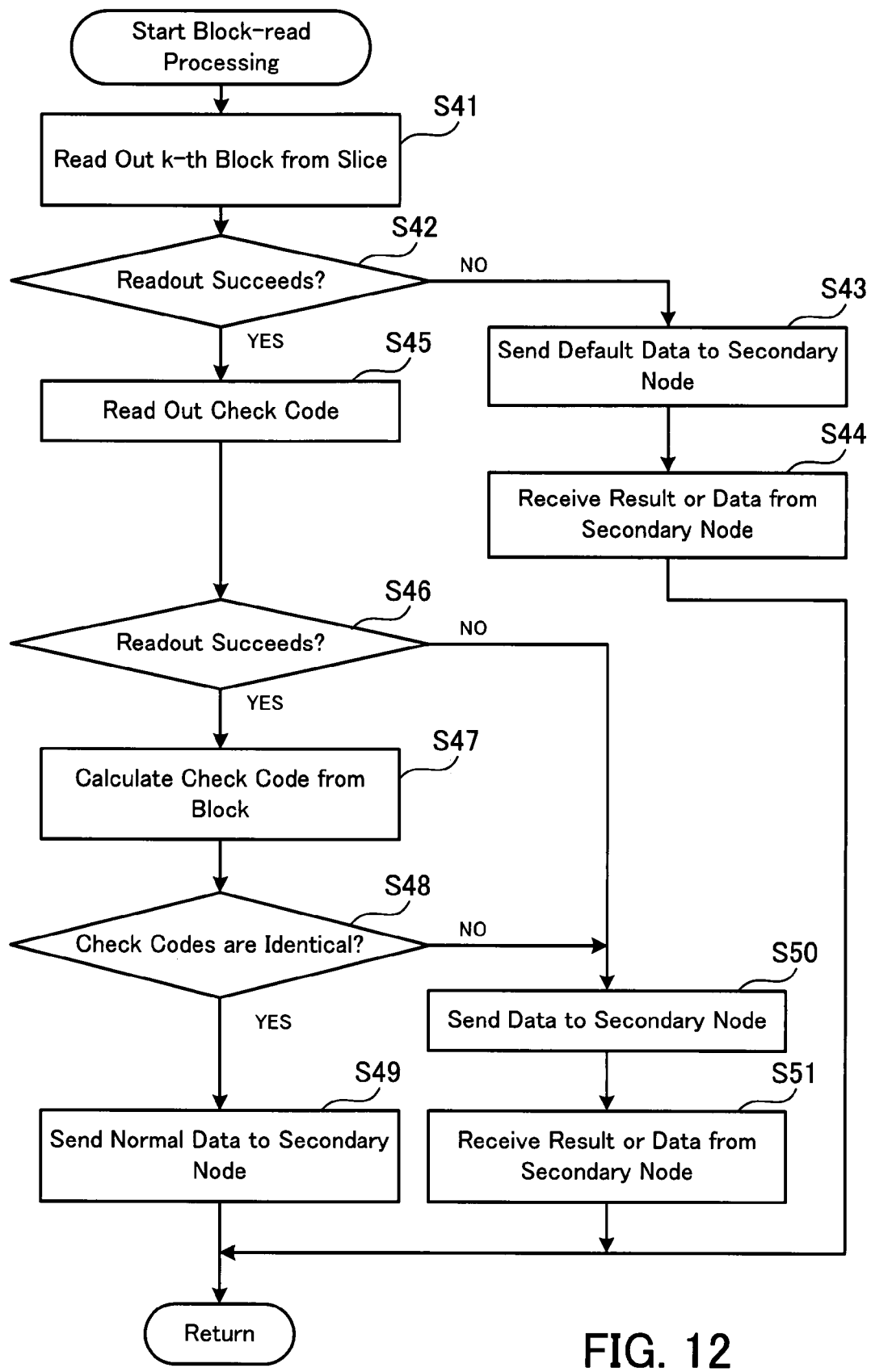
FIG. 12 is a flow diagram indicating a sequence of block-read processing.

Next, details of the block-read processing performed in step S33 are explained with reference to FIG. 12, which is a flow diagram indicating a sequence of processing for reading out data in step S33. The processing indicated in FIG. 12 is explained below step by step.

<Step S41> The data management unit 140 makes an attempt to read data from the k-th block in the physical slice 124 of the slice number "4" (corresponding to the primary slice) in the storage device 110.

<Step S42> The data management unit 140 determines whether or not the attempt to read the data in step S41 succeeds. When yes is determined, the operation goes to step S45. When no is determined, the operation goes to step S43.

<Step S43> Since the attempt to read the data in step S41 fails, the data management unit 140 transmits a check-request message containing default data to the storage node 400, which manages the secondary slice 742.

<Step S44> The data management unit 140 receives from the storage node 400 a response message containing data or a result of processing, and thereafter the processing of FIG. 12 is completed.

<Step S45> The data management unit 140 makes an attempt to read out the check code for the k-th block from the storage device 110.

<Step S46> The data management unit 140 determines whether or not the attempt to read the check code in step S45 succeeds. When yes is determined, the operation goes to step S47. When no is determined (e.g., when the check code cannot be read out due to a media error or the like), the operation goes to step S50.

<Step S47> The data management unit 140 calculates a check code on the basis of the data read out from the k-th block in the primary slice in step S41.

<Step S48> The data management unit 140 compares the check code calculated in step S47 with the check code read out in step S45, and determines whether or not the check codes are identical. When yes is determined, the operation goes to step S49. When no is determined, the operation goes to step S50.

In the case where the check code read out in step S45 is incorrect, the check code calculated in step S47 does not coincide with the check code read out in step S45 even when the data in the k-th block in the primary slice is correct. However, in this case, it is impossible to guarantee the correctness of the data in the k-th block in the primary slice, so that the reliability is lowered.

<Step S49> Since the check code calculated in step S47 is identical to the check code read out in step S45, the data management unit 140 determines that the data in the k-th block in the primary slice read out in step S41 is normal, and transmits a check-request message containing the normal data to the storage node 400 (managing the secondary slice 742). Thereafter, the processing of FIG. 12 is completed.

<Step S50> Since the operation of reading out the check code in step S46 fails, or the check codes are determined not to be identical in step S48, the data management unit 140 transmits a check-request message containing the data of the k-th block in the primary slice read out in step S41 to the storage node 400 managing the secondary slice 742.

<Step S51> The data management unit 140 receives from the storage node 400 a response message containing data or a result of processing, and thereafter the processing of FIG. 12 is completed.

Patrol Processing of Secondary Slice

Figure 13:
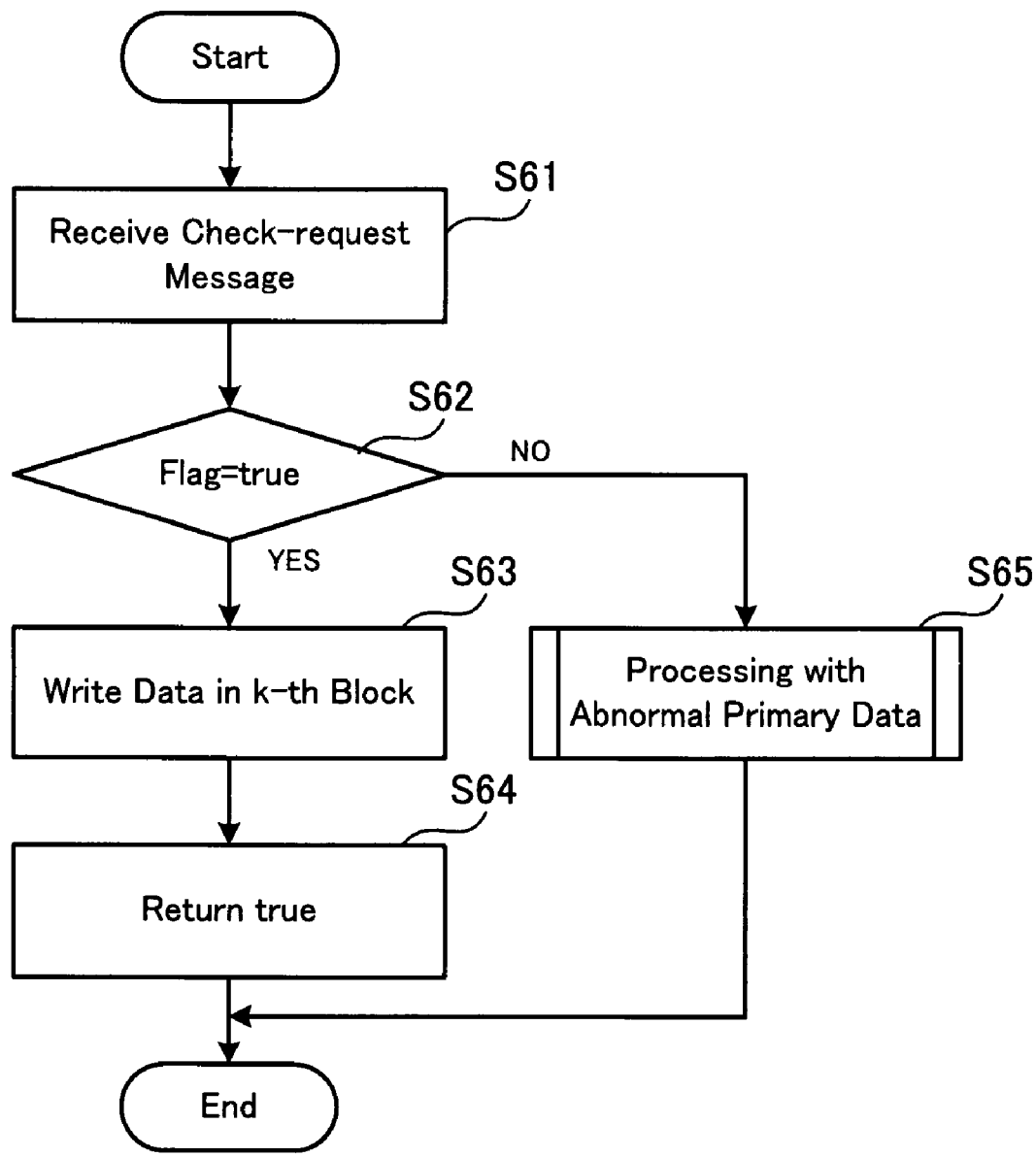
FIG. 13 is a flow diagram indicating a sequence of patrol processing of data in a secondary slice.

Next, the processing performed by the storage node 400 managing the secondary slice 742 is explained with reference to FIG. 13, which is a flow diagram indicating a sequence of patrol processing of data in the secondary slice. The processing of FIG. 13 is performed when the storage node 400 receives the check-request message. The processing indicated in FIG. 13 is explained below step by step.

<Step S61> The data management unit 440 in the storage node 400 receives the check-request message from the storage node 100 managing the primary slice. At this time, the data management unit 440 confirms on the basis of the slice-management information that the physical slice having the slice number contained in the received check-request message exists and corresponds to the secondary slice. In addition, the data management unit 440 confirms that the storage-node identifier and the primary-slice number indicated in the check-request message identical to the storage-node identifier and the primary-slice number which are respectively indicated in the slice-management information to be paired with the storage-node identifier and the primary-slice number in the check-request message.

<Step S62> After the confirmation in step S61 is completed, the data management unit 440 checks the flag in the check-request message, and determines whether or not the flag is "true." When the flag is "true," the operation goes to step S63. When the flag is "false," the operation goes to step S65.

<Step S63> The data management unit 440 writes the data contained in the check-request message, in the k-th block in the secondary slice, where the block number k of the k-th block is indicated in the fourth field 34 in the format of FIG. 9.

That is, according to the present embodiment, the storage node which manages the secondary slice and receives data writes the data in the position in the secondary slice corresponding to the position in the primary slice from which the data is read out. That is, write access to the data in the k-th block in the physical slice (corresponding to the secondary slice) in the RAID5-managed storage device 410 and the parity data corresponding to the k-th block is performed.

<Step S64> The data management unit 440 transmits a response message containing the flag "true" to the storage node 100 (which manages the primary slice), and thereafter the processing of FIG. 13 is completed.

<Step S65> The data management unit 440 performs processing which is to be performed when the primary data is abnormal, and thereafter the processing of FIG. 13 is completed.

Processing When Primary Data is Abnormal

Figure 14:
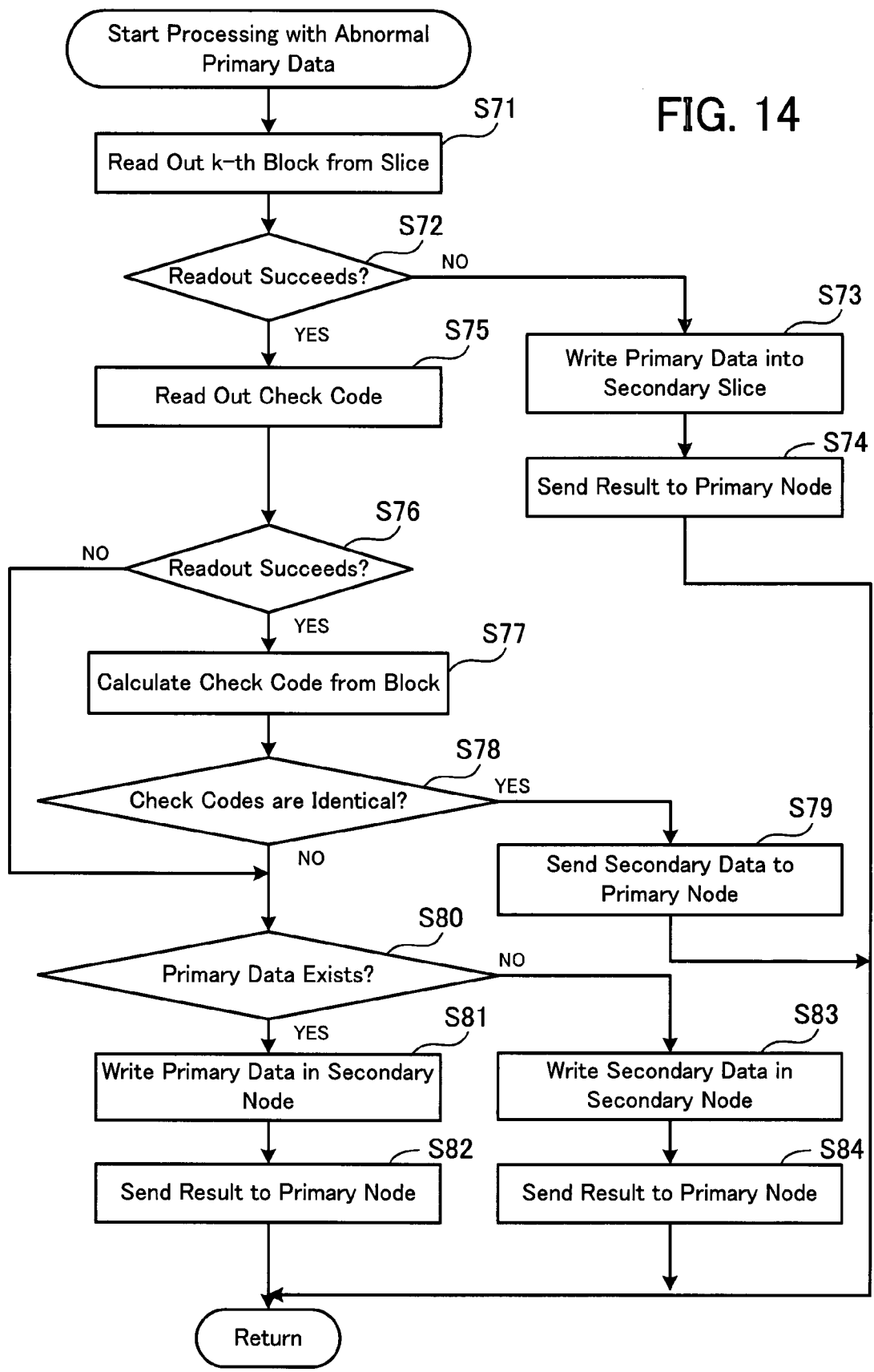
FIG. 14 is a diagram indicating a sequence of processing performed when an abnormality occurs in primary data.

Next, the processing performed by the storage node 400 (managing the secondary slice 742) is explained with reference to FIG. 14, which is a diagram indicating a sequence of processing performed when an abnormality occurs in primary data. The processing of FIG. 14 is performed when the storage node 400 receives the check-request message. The processing indicated in FIG. 14 is explained below step by step.

<Step S71> The data management unit 440 makes an attempt to read data from the k-th block in the physical slice 421 (corresponding to the secondary slice) in the storage device 410.

<Step S72> The data management unit 440 determines whether or not the attempt to read the data in step S71 succeeds. When yes is determined, the operation goes to step S75. When no is determined, the operation goes to step S73.

<Step S73> Since the operation of reading out the data in step S71 fails, the data management unit 440 writes the data sent from the storage node 100 (managing the primary slice), in the k-th block in the physical slice 421 (corresponding to the secondary slice) in the storage device 410.

<Step S74> The data management unit 440 sends the result of the processing to the storage node 100 by transmitting a response message containing the flag "PRIMARY" to the storage node 100, and thereafter the processing of FIG. 14 is completed.

<Step S75> Since the operation of reading out the data in step S71 succeeds, the data management unit 440 makes an attempt to read out the check code corresponding to the k-th block from the storage device 410.

\<Step S76\> The data management unit 440 determines whether or not the attempt to read the check code in step S75 succeeds. When yes is determined, the operation goes to step S77. When no is determined, the operation goes to step S80.

\<Step S77\> The data management unit 440 calculates a check code on the basis of the data in the k-th block in the secondary slice which is read out in step S71.

\<Step S78\> The data management unit 440 compares the check code calculated in step S77 with the check code read out in step S75, and determines whether or not the check codes are identical. When yes is determined, the operation goes to step S79. When no is determined, the operation goes to step S80.

\<Step S79\> Since the check code calculated in step S77 is identical to the check code read out in step S75, the data management unit 440 determines that the data in the block in the secondary slice read out in step S71 is normal, and transmits a response message containing the normal data and the flag "SECONDARY" to the storage node 100 (managing the primary slice). At this time, the k-th block in the physical slice 421 (corresponding to the secondary slice) in the storage device 410 may be overwritten with the data read out in step S71. When the data is written in a block in the storage device 410, parity data for the block is also accessed in the RAID5 system, so that it is possible to detect in an early stage a trouble occurring in an area in which the parity data is stored. After the transmission of the response message, the processing of FIG. 14 is completed.

\<Step S80\> Since the operation of reading out the check code in step S76 fails or the check codes are determined not to be identical in step S78, the data management unit 440 determines whether or not data is read out from the corresponding block in the primary slice. Specifically, when the data contained in the check-request message sent from the storage node 100 is different from the default data (which is, for example, all-zero data), it is possible to determine that the data is read out from the primary slice. When it is determined that data is read out from the corresponding block in the primary slice, the operation goes to step S81. When it is determined that data is not read out from the corresponding block in the primary slice, the operation goes to step S83.

\<Step S81\> The data management unit 440 writes the data read out from the primary slice, into the k-th block in the physical slice 421 (corresponding to the secondary slice) in the storage device 410. At this time, the data management unit 440 calculates the check code on the basis of the data written in the physical slice 421, and writes the calculated check code into the storage device 410.

\<Step S82\> The data management unit 440 sends the result of the processing to the storage node 100 by transmitting a response message containing the flag "PRIMARY" to the storage node 100, and thereafter the processing of FIG. 14 is completed.

\<Step S83\> The data management unit 440 recalculates the check code on the basis of the data read out from the physical slice 421 (corresponding to the secondary slice) in the storage device 410, and writes the data and the recalculated check code into the storage device 410.

\<Step S84\> The data management unit 440 sends the result of the processing to the storage node 100 by transmitting a response message containing the flag "SECONDARY" to the storage node 100, and thereafter the processing of FIG. 14 is completed.

As explained above, the data in the primary and secondary slices constituting each segment are checked in response to the instruction to perform the patrol processing.

Precedence of Primary Data

According to the present embodiment, when both of two pieces of data corresponding to the primary and secondary slices are abnormal (i.e., when both of two pieces of data corresponding to the primary and secondary slices fail in the consistency checking between the check code read out from the disk and the check code recalculated on the basis of data read out from the disk), the two pieces of data are equalized with the piece of data corresponding to the primary slice. This is because the equalization with the piece of data corresponding to the primary slice is superior in reliability to the equalization with the piece of data corresponding to the secondary slice or the storage of different data in the primary and secondary slices, as explained in detail below. In the following explanations, three cases A, B, and C where data are doubly stored are considered.

In the case A, when a piece of data is read out from the distributed storage system in which data are doubly stored, the piece of data is read out from only the primary slice, and no data is read out from the secondary slice. On the other hand, when a piece of data is written into the distributed storage system, the piece of data is written into both of the primary and secondary slices.

Figure 15:
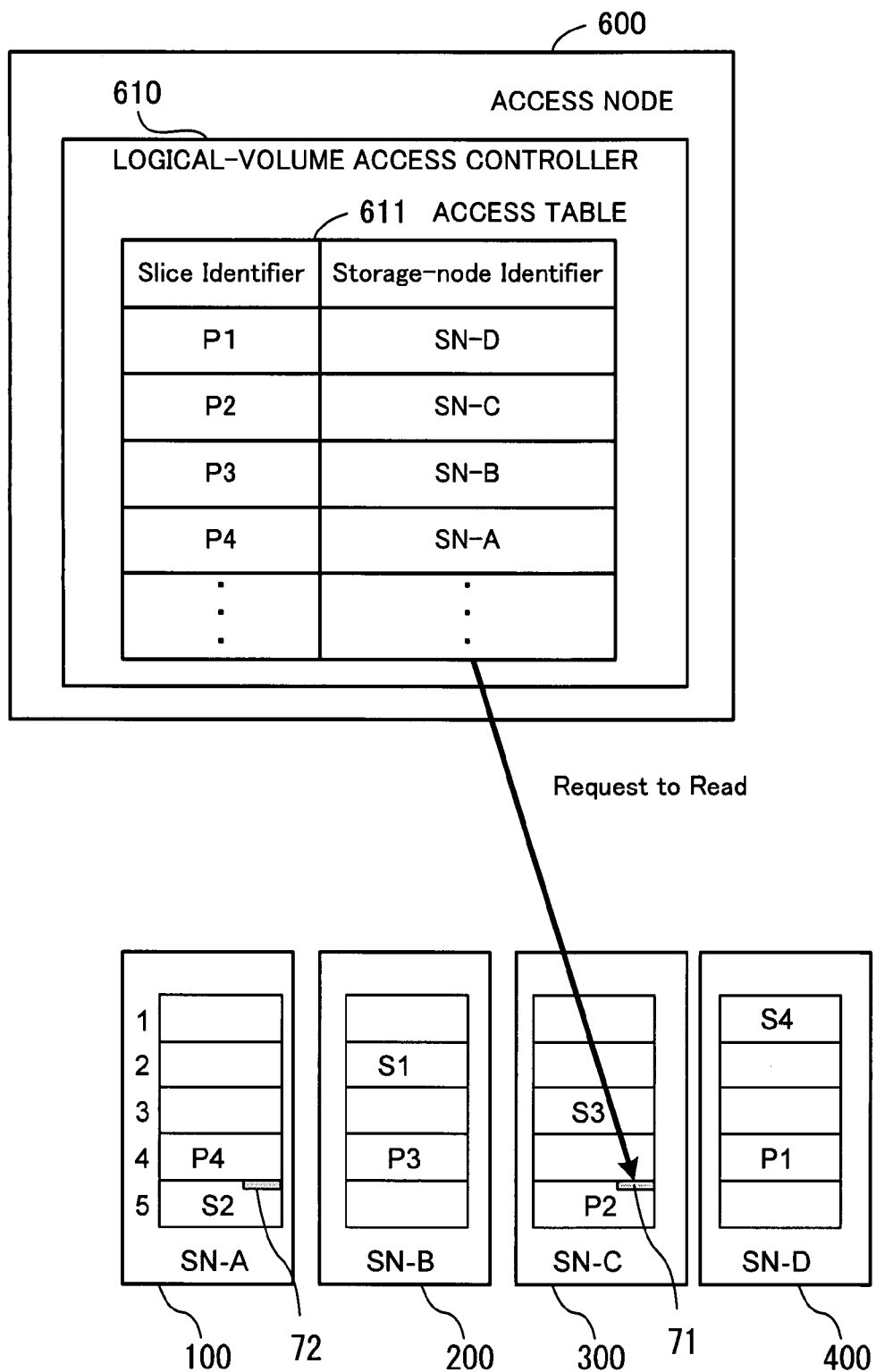
FIG. 15 is a diagram indicating processing for reading data.

First, the data reading operation is considered. FIG. 15 is a diagram indicating processing for reading data. The logical-volume access controller 610 in the access node 600 has an access table 611, which has the columns of the slice identifier and the storage-node identifier. In the column of the slice identifier, the slice identifiers of the primary and secondary slices managed by the storage nodes 100, 200, 300, and 400 are set. In the column of the storage-node identifier, the storage-node identifiers of the storage nodes are set.

When the logical-volume access controller 610 receives from the terminals 21, 22, and 23 a request to access the logical volume, the logical-volume access controller 610 refers to the access table 611, and determines a storage node managing a primary slice which constitutes a segment requested to be accessed. In the example shown in FIG. 15, access to the second segment in the logical volume is requested. In this case, the logical-volume access controller 610 refers to the access table 611, and recognizes that the primary slice P2 in the second segment is managed by the storage node 300 having the storage-node identifier "SN-C." Therefore, the logical-volume access controller 610 outputs to the storage node 300 an access request in which the data in the primary slice P2 is designated.

Then, the data access unit 330 (illustrated in FIG. 5) in the storage node 300 receives the access request, refers to the slice-management information in the slice-management-information storing unit 350, recognizes the slice number "5" corresponding to the slice identifier "P2," and accesses the physical slice having the slice number "5" in the storage device 310.

If the allocations of the physical slices for the primary and secondary slices are not changed, it is possible to maintain two pieces of data in the primary and secondary slices as they are even when both of the two pieces of data in the primary and secondary slices are abnormal. Since neither of the two pieces of data in the primary and secondary slices is reliable, there is no reason for equalizing one of the two pieces of data in the primary and secondary slices with the other of the two pieces of data.

Figure 16:
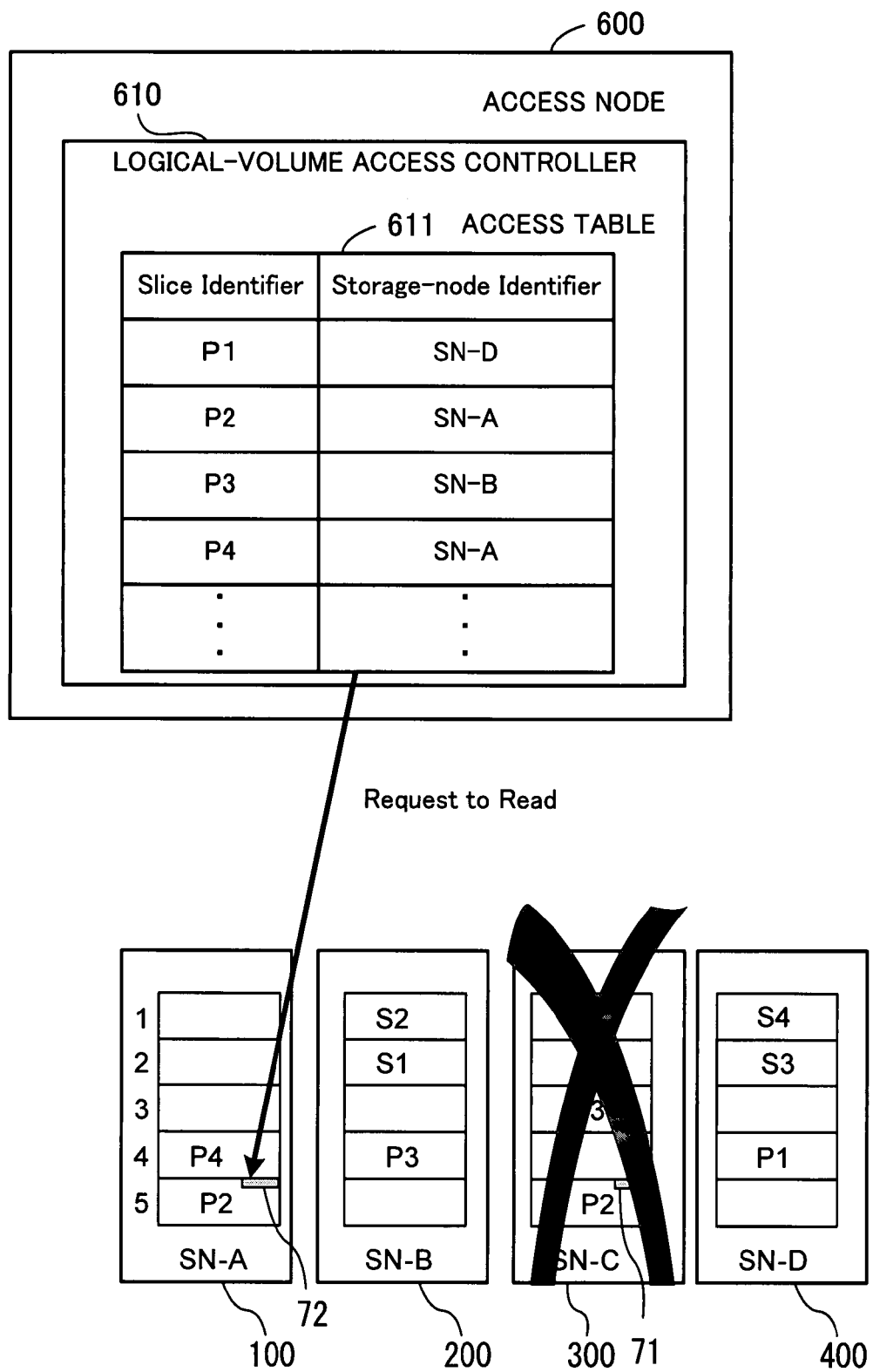
FIG. 16 is a flow diagram indicating an example of slice relocation performed when a failure occurs.

However, in order to increase the reliability of the system, it is necessary to consider the failure of the storage nodes and the storage devices and a way to cope with the failure. FIG. 16 is a flow diagram indicating an example of slice relocation performed when a failure occurs. In the example illustrated in FIG. 16, a failure occurs in the storage node 300. In order to cope with the failure in the storage node 300, the slice associated with the fifth physical slice managed by the storage node 100 is changed from the secondary slice S2 to the primary slice P2, and the physical slice associated with the secondary slice S2 is changed from the fifth physical slice managed by the storage node 100 to the first physical slice managed by the storage node 200. That is, the above relocation of the slices is performed by the logical-volume management unit 510 in the control node 500, and the result of the relocation is sent to the data management units 140, 240, 340, and 440 in the storage nodes. 100, 200, 300, and 400 and the logical-volume access controller 610 in the access node 600.

Assume that a data abnormality (an inconsistency between check codes) is detected in the 1000th block in each of the slices "P2" and "S2" illustrated in FIG. 15 in the system operating as above, and at almost the same time as the detection of the data abnormality, the system externally receives a request to read out data from the 1000th block in the slice "P2," and the storage node 300 managing the slice "P2" returns the data to the source of the request. If the storage node 300 fails for some reason at this time, the slice associated with the fifth physical slice managed by the storage node 100 is changed from the secondary slice "S2" to the primary slice "P2," and the first physical slice managed by the storage node 200 is newly used for the secondary slice "S2." Thus, the duplexity of the data is preserved.

Further, during operation of the system, it is necessary to preserve the data consistency in reading from the primary slice. That is, the data stored in a physical slice associated with a primary slice (e.g., the fifth physical slice managed by the storage node 300) before occurrence of a failure should be identical to the data stored in another physical slice associated with the primary slice (e.g., the fifth physical slice managed by the storage node 100) after the occurrence of the failure. Otherwise, the data returned in response to a request to read out a block in a segment (e.g., the 1000th block in the second segment 720) before occurrence of a failure differs from the data returned in response to the same request to read out the same segment after the occurrence of the failure, so that the source of the requests (e.g., a terminal) receives different data before and after the occurrence of the failure, i.e., a contradiction occurs.

In order to lower the possibility of occurrence of a contradiction as above, according to the present embodiment, when data in both of the primary and secondary slices are abnormal, the data in the primary slice is used for equalizing the data in the primary and secondary slices.

For example, assume that a data abnormality is detected in each of the 1000th block 71 in the fifth physical slice managed by the storage node 100 and associated with the secondary slice "S2" and the 1000th block 72 in the fifth physical slice managed by the storage node 300 and associated with the secondary slice "P2." Since, at this time, the data in the 1000th block 71 can be read out in response to a request to read out, it is not desirable to change the data in the 1000th block 71 in the physical slice associated with the primary slice for preserving the data consistency.

After the occurrence of the failure, the fifth physical slice managed by the storage node 100 is associated with the primary slice "P2" as illustrated in FIG. 16. At this time, it is desirable that the data in the 1000th block 72 in the fifth physical slice managed by the storage node 100 and associated with the secondary slice "P2" after the occurrence of the failure be identical to the data read out from the 1000th block 71 in the fifth physical slice managed by the storage node 300 and associated with the secondary slice "P2" before the occurrence of the failure. Therefore, when a data abnormality is detected in each of the blocks 71 and 72 during the patrol processing, the data in the block 72 is updated with the data in the block 71, so that it is possible to preserve the consistency of data read out in response to a request to read out from the second segment, and avoid occurrence of a contradiction in data received by the source of the request, even after the occurrence of the failure.

The cases B and C are different from the case A in their data readout operations, although the data write operations in the cases A, B, and C are identical.

In the data readout operation in the case B, the primary and secondary slices are concurrently accessed, and the system receives data from one of the primary and secondary slices which responds earlier. The data writing operation in the case B is performed in a similar manner to the case A, so that data is written in both the primary and secondary slices.

In the case C, when data is read out, one of the primary and secondary slices is determined to be accessed, by some criterion, and is then actually accessed. According to an example of the criterion, the slice to be accessed is alternately changed between the primary and secondary slices. The data writing operation is performed in a similar manner to the case A, so that data is written in both the primary and secondary slices.

In the cases B and C, when different data are stored in areas for the primary and secondary slices of an identical segment, it is more likely that a contradiction occurs on the user side. Therefore, the data in the primary and secondary slices should be equalized with the data in one of the primary and secondary slices. In this example, the data in the primary and secondary slices are equalized with the data in the primary slice, so that it is possible to commonly cope with the failure in the cases A, B, and C.

Summary of Operation

As explained above, according to the present embodiment, when the data in the primary slice is normal, the data read out from the primary slice is written into both of the primary and secondary slices. On the other hand, when an abnormality is detected in an operation of reading out data from a first block in the primary slice, data in a second block in the secondary slice corresponding to the first block in the primary slice is read out by the storage node which manages the secondary slice. When the data in the secondary slice is read out without a problem, the data of the second block in the secondary slice is transferred to the storage node which manages the primary slice, which writes the data into the first block in the primary slice. Further, when an abnormality is detected in an operation of reading out data from each of the primary and secondary slices, the following processing is performed according to the type of the abnormality. When the data abnormalities in the primary and secondary slices are inconsistencies between check codes, the data read out from the primary slice is written in both of the primary and secondary slices. When the data abnormality in one of the primary and secondary slices is an inconsistency between check codes, and the data abnormality in the other is occurrence of a bad block (failure in the reading operation), the data which is read out is written in both of the primary and secondary slices even though the intensity between the check codes occurs. When the data abnormalities in both of the primary and secondary slices are bad blocks, the default data is written in both of the primary and secondary slices.

Thus, according to the present embodiment, the data in the primary and secondary slices are checked, and equalized with data having the highest possible reliability, so that abnormal data can be appropriately restored, and the data loss can be prevented. In addition, when the primary and secondary slices have the same reliability, the data in the primary slice is preferentially used for equalizing the data in the primary and secondary slices. Therefore, it is possible to preserve the data consistency in the primary slice in each segment which is accessed by the user.

Variations

The present embodiment may be modified as follows.

In the case where the RAID system has a countermeasure mechanism against the bad block, it is possible to simplify the patrol processing by relying on the countermeasure mechanism. For example, the patrol processing may perform basically only the data readout operation. In this case, the patrol processing may compare the data in the primary and secondary slices, and perform the data writing operation only when the data in the primary and secondary slices are different. Therefore, it is unnecessary to perform the data writing operation as long as the data is normal, so that the processing efficiency can be increased.

In addition, although it is desirable that each of the storage devices managed by the storage nodes realize a RAID system which redundantly stores data, alternatively, it is possible to use a disk storage system which does not have data redundancy, e.g., a JBOD (Just a Bunch Of Disks) or RAID0 system. In the disk storage system which does not have data redundancy, it is possible to dispense with the operation of writing back data into the position from which the data is read out, unless an abnormality occurs in the operation of reading out data in the primary slice. As mentioned before, in the RAID system, the operation of writing back data into the position from which the data is read out is performed in order to access an area which is not accessed by the data readout operation (e.g., the area storing parity data). On the other hand, in the disk storage system which does not have data redundancy, identical areas are accessed by the data readout operation and the data writing operation, so that it is unnecessary to write back data into the position from which the data is read out.

Further, the storage devices managed by the storage nodes constituting the distributed storage system may not be identical types. For example, it is possible to arrange the distributed storage system so that a part of the storage devices are RAID systems, and the remaining part of the storage devices are disk storage systems which do not have data redundancy. In this case, the operation of writing back data into the position from which the data is read out is necessary in the first part, and unnecessary in the remaining part.

Furthermore, although it is desirable to store check codes corresponding to the stored data, alternatively, the check codes may be dispensed with. In the case where the check codes are not stored, the storage capacity of the storage devices can be efficiently used. However, in the case where the check codes are not stored, it is necessary to compare the data in the primary and secondary slices at all times. Therefore, each storage node which manages a secondary slice is required to perform an operation of reading out data from the secondary slice even when the flag contained in the check-request message is "true."

Recording Medium Storing Program

The processing functions of each of the storage nodes 100, 200, 300, and 400, the control node 500, and the access node 600 according to the present embodiment which are explained above can be realized by a computer. In this case, a program describing details of processing for realizing the functions which each of the storage nodes 100, 200, 300, and 400, the control node 500, and the access node 600 should have is provided. When the computer executes the program, the processing functions of each of the storage nodes 100, 200, 300, and 400, the control node 500, and the access node 600 can be realized on the computer.

The program describing the details of the processing can be stored in a recording medium which can be read by the computer. The recording medium may be a magnetic recording device, an optical disk, an optical magnetic recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Recordable)/RW (ReWritable), or the like. The optical magnetic recording medium may be an MO (Magneto-Optical Disk) or the like.

In order to put the program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which executes the program stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further alternatively, the computer can sequentially execute processing in accordance with each portion of the program every time the portion of the program is transferred from the server computer.

Additional Matter

As explained above, according to the present invention, each storage node checks data managed by the storage node. When an abnormality is detected in the data, the storage node acquires redundant data from another storage node which is paired with the above storage node, and overwrites the abnormal data with the acquired data. Therefore, it is possible to detect a data abnormality in an early stage, and suppress occurrence of data loss.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium storing a storage management program which makes a computer realize a storage management apparatus for managing first data stored in a first storage area in a storage device which a first one of a plurality of storage nodes has, where the plurality of storage nodes are connected with each other, have storage devices for storing data, and constitute a distributed storage system managing the data stored in the storage devices in a distributed manner, the storage management apparatus comprising:

a management-information storing unit which stores management information in which a second one of said plurality of storage nodes is registered, where the second one of the plurality of storage nodes is paired with said first one of the plurality of storage nodes and manages second data identical to said first data;

a data checking unit which reads out said first data from said storage device, and determines whether or not the first data is normal, when said first one of the plurality of storage nodes receives an instruction to check the first data;

a data acquisition unit which recognizes said second one of the plurality of storage nodes paired with said first one of the plurality of storage nodes by reference to said management information, and acquires said second data, when said data checking unit detects an abnormality in said first data; and a data writing unit which overwrites said first storage area with said second data when said data checking unit detects an abnormality in said first data and said data acquisition unit acquires the second data.

2. The computer-readable medium according to claim 1, wherein said storage management apparatus further comprises a data access unit which reads out said first data from said storage device, or generates a first check code on the basis of the first data and writes the first data and the first check code in association with each other in the storage device, in response to a data access request, and said data checking unit determines whether or not the first data is normal by reading out said first check code from said storage device, generating a second check code on the basis of said first data read out from the storage device, and comparing the first check code with the second check code.

3. The computer-readable medium according to claim 1, wherein said data writing unit overwrites said first storage area with the first data read out from the storage device, when said data checking unit determines that the first data is normal.

4. The computer-readable medium according to claim 1, wherein said data acquisition unit sends to said second one of the plurality of storage nodes a check-request message containing said first data and a first flag indicating whether or not the first data is normal, and receives a response message containing a second flag indicating data stored by said second one of the plurality of storage nodes in a second storage area provided for storing said second data, where the response message further contains said second data when the second data is stored by the second one of the plurality of storage nodes in the second storage area.

5. The computer-readable medium according to claim 1, wherein when said first one of the plurality of storage nodes receives from said second one of the plurality of storage nodes a check-request message which contains said second data and a first flag indicating whether or not the second data is normal, and the first flag indicates that the second data is normal, said data writing unit overwrites said first storage area with said second data.

6. The computer-readable medium according to claim 4, wherein said data writing unit overwrites said first storage area with said first data when said first data is determined to be abnormal and said second flag indicates the first data is stored in said second storage area.

7. The computer-readable medium according to claim 4, wherein said data acquisition unit inserts predetermined default data, instead of said first data, into said check-request message when said data checking unit fails at reading out the first data from said storage device.

8. The computer-readable medium according to claim 5, wherein said data checking unit reads out said first data from said storage device and determines whether or not the first data is normal when said first flag indicates that the second data is abnormal, and said data writing unit overwrites said first storage area with said first data when said first one of the plurality of storage nodes receives said check-request message from said second one of the plurality of storage nodes and the first data is normal, and overwrites said first storage area with said second data when the first one of the plurality of storage nodes receives the check-request message from the second one of the plurality of storage nodes and the first data is abnormal.

9. The computer-readable medium according to claim 8, wherein said storage management apparatus further comprises a data transmission unit which transmits to said second one of the plurality of storage nodes a response message containing data with which the first storage area in said storage device is overwritten when said first one of the plurality of storage nodes receives said check-request message.

10. A storage management apparatus for managing first data stored in a first storage area in a storage device which a first one of a plurality of storage nodes has, where the plurality of storage nodes are connected with each other, have storage devices for storing data, and constitute a distributed storage system managing the data stored in the storage devices in a distributed manner, the storage management apparatus comprising:

a management-information storing unit which stores management information in which a second one of said plurality of storage nodes is registered, where the second one of the plurality of storage nodes is paired with said first one of the plurality of storage nodes and manages second data identical to said first data;

a data checking unit which reads out said first data from said storage device, and determines whether or not the first data is normal, when said first one of the plurality of storage nodes receives an instruction to check the first data;

a data acquisition unit which recognizes said second one of the plurality of storage nodes paired with said first one of the plurality of storage nodes by reference to said management information, and acquires said second data, when said data checking unit detects an abnormality in said first data; and a data writing unit which overwrites said first storage area with said second data when said data checking unit detects an abnormality in said first data and said data acquisition unit acquires the second data.

11. The storage management apparatus according to claim 10, further comprising a data access unit which reads out said first data from said storage device, or generates a first check code on the basis of the first data and writes the first data and the first check code in association with each other in the storage device, in response to a data access request, and said data checking unit determines whether or not the first data is normal by reading out said first check code from said storage device, generating a second check code on the basis of said first data read out from the storage device, and comparing the first check code with the second check code.

12. The storage management apparatus according to claim 10, wherein said data writing unit overwrites said first storage area with the first data read out from the storage device, when said data checking unit determines that the first data is normal.

13. The storage management apparatus according to claim 10, wherein said data acquisition unit sends to said second one of the plurality of storage nodes a check-request message containing said first data and a first flag indicating whether or not the first data is normal, and receives a response message containing a second flag indicating data stored by said second one of the plurality of storage nodes in a second storage area provided for storing said second data, where the response message further contains said second data when the second data is stored by the second one of the plurality of storage nodes in the second storage area.

14. The storage management apparatus according to claim 10, wherein when said first one of the plurality of storage nodes receives from said second one of the plurality of storage nodes a check-request message which contains said second data and a first flag indicating whether or not the second data is normal, and the first flag indicates that the second data is normal, said data writing unit overwrites said first storage area with said second data.

15. The storage management apparatus according to claim 13, wherein said data writing unit overwrites said first storage area with said first data when said first data is determined to be abnormal and said second flag indicates the first data is stored in said second storage area.

16. The storage management apparatus according to claim 13, wherein said data acquisition unit inserts predetermined default data, instead of said first data, into said check-request message when said data checking unit fails at reading out the first data from said storage device.

17. The storage management apparatus according to claim 14, wherein said data checking unit reads out said first data from said storage device and determines whether or not the first data is normal when said first flag indicates that the second data is abnormal, and said data writing unit overwrites said first storage area with said first data when said first one of the plurality of storage nodes receives said check-request message from said second one of the plurality of storage nodes and the first data is normal, and overwrites said first storage area with said second data when the first one of the plurality of storage nodes receives the check-request message from the second one of the plurality of storage nodes and the first data is abnormal.

18. The storage management apparatus according to claim 17, wherein further comprising a data transmission unit which transmits to said second one of the plurality of storage nodes a response message containing data with which the first storage area in said storage device is overwritten when said first one of the plurality of storage nodes receives said check-request message.

19. A storage management process for managing first data stored in a first storage area in a storage device which a first one of a plurality of storage nodes has, where the plurality of storage nodes are connected with each other, have storage devices for storing data, and constitute a distributed storage system managing the data stored in the storage devices in a distributed manner, the storage management process comprising the steps of:

(a) reading out said first data from said storage device, and determining whether or not the first data is normal, when said first one of the plurality of storage nodes receives a request to check the first data;

(b) determining a second one of said plurality of storage nodes to be paired with said first one of the plurality of storage nodes by reference to management information which is stored in advance and in which the second one of the plurality of storage nodes is registered, and acquiring second data which is identical to said first data and managed by the second one of the plurality of storage nodes, when an abnormality is detected in said first data; and (c) overwriting said first storage area with said second data when an abnormality is detected in said first data and the second data is acquired in step (b).

* * * * *